United States Patent
Schreder et al.

(10) Patent No.: US 12,391,602 B2
(45) Date of Patent: Aug. 19, 2025

(54) OPTICAL COMPONENT AND GLASS COMPOSITION AS WELL AS USE THEREOF

(71) Applicant: Schott AG, Mainz (DE)

(72) Inventors: Bianca Schreder, Sulzbach (DE); Ute Wölfel, Mainz-Laubenheim (DE); Stefanie Hansen, Gensingen (DE); Ralf Biertümpfel, Mainz-Kastel (DE); Frank Wolff, Mainz (DE)

(73) Assignee: Schott AG, Mainz (DE)

( * ) Notice: Subject to any disclaimer, the term of this patent is extended or adjusted under 35 U.S.C. 154(b) by 152 days.

(21) Appl. No.: 18/098,535

(22) Filed: Jan. 18, 2023

(65) Prior Publication Data

US 2023/0227348 A1    Jul. 20, 2023

(30) Foreign Application Priority Data

Jan. 19, 2022  (EP) .................................... 22152321

(51) Int. Cl.
*C03C 4/10* (2006.01)
*C03C 3/089* (2006.01)
(Continued)

(52) U.S. Cl.
CPC ............... *C03C 4/10* (2013.01); *C03C 3/089* (2013.01); *C03C 3/095* (2013.01); *C03C 3/11* (2013.01);
(Continued)

(58) Field of Classification Search
CPC ..... C03C 2204/00; C03C 3/089; C03C 3/095; C03C 3/11; C03C 4/10; C03C 4/20; G01S 7/4813
See application file for complete search history.

(56) References Cited

U.S. PATENT DOCUMENTS 5,446,007 A * 8/1995 Krashkevich ........... C03C 3/085
501/67
6,071,840 A   6/2000 Sasage et al.
(Continued)

FOREIGN PATENT DOCUMENTS

JP    H07-126036 A   5/1995
SU    321485 A1    1/1972
(Continued)

OTHER PUBLICATIONS

"Chemical Abstracts", 113, No. 2, Columbus, Ohio, Jul. 9, 1990 (1 page).
(Continued)

*Primary Examiner* — Lawrence D Ferguson
(74) *Attorney, Agent, or Firm* — TAYLOR & EDELSTEIN, PC

(57) ABSTRACT

A glass includes: a plurality of components (in wt.-%) as follows:

| Component | Proportion (% by weight) |
|---|---|
| $SiO_2$ | 50-80 |
| $Al_2O_3$ | 0-10 |
| $B_2O_3$ | 0-15 |
| $Li_2O$ | 0-20 |
| $Na_2O$ | 0-20 |
| $K_2O$ | 0-25 |
| BaO | 0-10 |
| CaO | 0-10 |
| MgO | 0-10 |
| ZnO | 0-10 |
| $La_2O_3$ | 0-20 |
| $TiO_2$ | 0-5 |

(Continued)

-continued

| Component | Proportion (% by weight) |
|---|---|
| Cl | 0-3 |
| $MnO_2$ | 0.2-5.0 |
| $Cr_2O_3$ | 0.05-3.0, | a sum of a plurality of proportions of $Li_2O$, $Na_2O$ and $K_2O$ being in a range of from 5.0 to 30.0 wt.-%, a sum of a plurality of amounts of $MnO_2$ and $Cr_2O_3$ being at least 0.3 wt.-%, and a ratio of a plurality of proportions of $MnO_2$ (in wt.-%) and $Cr_2O_3$ (in wt.-%) being in a range of from 1.5:1 to 12.5:1.

16 Claims, 4 Drawing Sheets

(51) Int. Cl.
    *C03C 3/095* (2006.01)
    *C03C 3/11* (2006.01)
    *C03C 4/20* (2006.01)
    *G01S 7/481* (2006.01)

(52) U.S. Cl.
    CPC ............ *C03C 4/20* (2013.01); *C03C 2204/00* (2013.01); *G01S 7/4813* (2013.01)

(56) References Cited

U.S. PATENT DOCUMENTS

| 11,465,929 | B2 | 10/2022 | Lautenschläger et al. |
| 2016/0031747 | A1 | 2/2016 | Yamamoto et al. |
| 2017/0217825 | A1 | 8/2017 | Hasegawa et al. |
| 2018/0079679 | A1 | 3/2018 | Kass |
| 2019/0284086 | A1 | 9/2019 | Fedullo et al. |
| 2019/0382303 | A1 | 12/2019 | Grimm et al. |
| 2021/0132273 | A1 | 5/2021 | Yamamoto et al. |
| 2021/0191014 | A1 | 6/2021 | Schreder et al. |
| 2021/0309561 | A1 | 10/2021 | Bogaerts et al. |
| 2022/0380248 | A1 | 12/2022 | Li et al. |

FOREIGN PATENT DOCUMENTS

| SU | 920016 A1 | 4/1982 |
| WO | 2019/009336 A1 | 1/2019 |
| WO | 2019/030106 A1 | 2/2019 |
| WO | 2019/065643 A1 | 4/2019 |
| WO | 2020/204194 A1 | 10/2020 |

OTHER PUBLICATIONS

Extended European Search Report dated Aug. 5, 2022 for European Patent Application No. 22152321.0 (8 pages).
"Optics and photonics—Specification of optical raw glass", DIN ISO 12123:2018 (34 pages).
"Glass—Water resistance of glass semolina at 98 degC—Test methods and classifications", DIN ISO 719:1989 (16 pages).
"Water resistance of glass grit at 121 degC", DIN ISO 720:1985 (8 pages).
"Glass—Resistance to boiling aqueous mixed liquor", DIN ISO 695:1991 (7 pages).
"Testing the resistance of glass to attach by boiling hydrochloric acid solution, and classification", DIN ISO 12116:1976 (5 pages).
"Coating materials—Testing of stone impact resistance of coatings—Part 1: Multi-impact test", DIN ISO 20567-1:207 (21 pages).
"Preparations of steel substrates before application of paints and related products—Specifications for metallic blast-cleaning abrasives—Part 2: Chilled-iron grit", DIN ISO 11124-2:1997 (13 pages).
"Preparation of steel substrates before applications of paints and related products—Test methods for metallic blast-cleaning abrasives—Part 2: Determination of particle size distribution", DIN ISO 11125-2:2018 (13 pages).
"Test Sieves—Metal Wire cloth, perforated metal plate and electroformed sheet—Nominal sizes of openings", DIN ISO 565:1990 (7 pages).
German Office Action dated May 31, 2023 for German Patent Application No. 10 2020 122 220.3 (6 pages).
Extended European Search Report dated Jun. 24, 2020 for European Patent Application No. 19 40 1057 (7 pages).

* cited by examiner

OPTICAL COMPONENT AND GLASS COMPOSITION AS WELL AS USE THEREOF

CROSS REFERENCE TO RELATED APPLICATIONS

This is a continuation of European patent application no. EP 22152321.0, filed Jan. 19, 2022, which is incorporated herein by reference.

BACKGROUND OF THE INVENTION

1. Field of the Invention

The present invention relates to a glass composition and a glass article such as an optical component having a low transmittance in the visible range and a high transmittance in the near-infrared (NIR) range. The present invention also relates to uses thereof, in particular in the automotive sector.

2. Description of the Related Art

Glasses having a low transmittance in the visible range are often referred to as "black glass" due to their black appearance. However, common black glass generally has a transmittance that is high enough to allow visual inspection of structures positioned behind the glass, unless the glass is provided with a comparably high thickness. When used at low thickness, common black glasses do not appear to be entirely black. Rather, they often give rise to a dark blue or dark green color impression. Furthermore, black glasses often include toxic components that are not acceptable in many fields of application.

In view of the disadvantages described above, it is not surprising that potential applications of black glasses have been limited to certain narrow fields, in particular to applications in which a high thickness was acceptable as it was not experienced as a major disadvantage.

However, in order to open up new fields of application, the above-discussed disadvantages have to be overcome. For example, an accordingly improved black glass that additionally has a high transmittance in the NIR range may be advantageously used as an optical component or bandpass filter in applications including NIR lasers. Interestingly, the number of such applications has drastically increased in recent years, in particular for optical measurements of distance and/or speed. Commonly known is a method that is often referred to as LiDAR (Light Detection And Ranging) or sometimes also as LaDAR (Laser Detection And Ranging). LiDAR systems generally work by emitting laser light in the NIR spectrum, in particular having wavelengths of more than 780 nm, in particular more than 1000 nm, such as from 1250 to 1350 nm or from 1500 to 1600 nm. Such laser light is reflected from objects in the surrounding at least partially back into the LiDAR system and detected there. Based on the pattern of the reflected laser light the LiDAR system may recognize objects. Based on the Time of Flight the LiDAR system may determine the distance of objects. Some LiDAR system may determine the speed of objects based on phase relationship of emitted and reflected laser light.

LiDAR systems are for example required for autonomous driving. However, there are plenty of additional fields of application, in particular robotics, drones, satellites, marine, mining, construction, railways and so on.

LiDAR systems require an optical window positioned between the opto-electronic components of the system and the surroundings in order to provide protection against environmental impacts. Depending on the type of LiDAR system, such optical windows may be planar or curved. Commonly used are also spinning LiDAR systems in which emitter and detector rotate within a typically stationary ring window.

Commonly known LiDAR systems typically include optical windows made of polymeric materials, in particular materials such as polycarbonate (PC) or poly(methyl methacrylate) (PMMA). However, such materials have several disadvantages, in particular regarding scratch resistance, mechanical resistance and chemical resistance.

Therefore, there have been attempts to use glass as material for such optical windows. For example, WO 2019/030106 A1 discloses a LiDAR system having a cover lens including a glass. However, the advantageous transmittance properties of the glasses of the present invention that combine high transmittance in the NIR range with low transmittance in the visible range are not achieved.

Furthermore, WO 2019/009336 A1 discloses a sensor module including a protective member being formed of strengthened glass. However, the glasses have a high transmittance in the visible range.

These prior art glasses do not have the advantageous properties of the glasses of the present invention.

Other disadvantages of prior art black glasses are inferior chemical and mechanical resistance. Notably, chemical and mechanical resistance are particularly relevant for use of black glasses in LiDAR systems, in particular in the automotive field. For example, the window glasses in LiDAR systems are commonly exposed to environmental conditions such as rain and snow so that a good chemical resistance (in particular, hydrolytic resistance, acid resistance and/or alkaline resistance) is advantageous. Depending on the environment, the pH and salt concentration that the glass is exposed to may vary substantially so that a broad chemical resistance is beneficial. Furthermore, the glass is usually not only exposed to various conditions due to natural phenomena such as rain or snow. Rather, chemical resistance is also very important for example due to car wash. If the glass does not have a good chemical resistance, it may turn opaque after several car wash cycles.

Moreover, as the glass is exposed to the environment, it is also exposed to various physical stresses such as for example solar radiation, temperature changes and/or mechanical impacts such as for example stone chippings or gravel hitting the glass, potentially also with high velocities. The prior art glasses do not combine optical, chemical, and mechanical properties desired for black glasses to be used in or as optical windows in LiDAR systems.

What is needed in the art is to overcome the disadvantages of the prior art.

SUMMARY OF THE INVENTION

The glass of the present invention is characterized by particularly low transmittance in the visible range. On the other hand, the transmittance in the NIR-range is particularly high. Moreover, the glass of the present invention is particularly color-neutral. Optionally, the glass is free of components like NiO, Cr(VI) and/or $V_2O_5$ that are not desired in the automotive industry. In particular, Cr(VI) is neither used as raw material nor obtained by oxidative conditions during production of the glass. Oxidative conditions are optionally avoided. Chromium is optionally present in the glass as Cr(III). In particular, at least 90%, at least 95%, at least 98%, at least 99%, or at least 99.9% of chromium are present as Cr(III). Furthermore, the glass has a particularly high chemical stability and mechanical stability. Optionally, the glass of the present invention can be processed by hot forming which is particularly advantageous for obtaining flat or ring-shaped optical components.

In one aspect, the glass of the present invention includes the following components (in wt.-%):

| Component | Proportion (% by weight) |
|---|---|
| $SiO_2$ | 50-80 |
| $Al_2O_3$ | 0-10 |
| $B_2O_3$ | 0-15 |
| $Li_2O$ | 0-20 |
| $Na_2O$ | 0-20 |
| $K_2O$ | 0-25 |
| BaO | 0-10 |
| CaO | 0-10 |
| MgO | 0-10 |
| ZnO | 0-10 |
| $La_2O_3$ | 0-20 |
| $TiO_2$ | 0-5 |
| Cl | 0-3 |
| $MnO_2$ | 0.2-5.0 |
| $Cr_2O_3$ | 0.05-3.0 | wherein the sum of the proportions of $Li_2O$, $Na_2O$ and $K_2O$ is in a range of from 5.0 to 30.0 wt.-%, wherein the sum of the amounts of $MnO_2$ and $Cr_2O_3$ is at least 0.3 wt.-%, and wherein the ratio of the proportions of $MnO_2$ (in wt.-%) and $Cr_2O_3$ (in wt.-%) is in a range of from 1.5:1 to 12.5:1.

In another aspect, the glass of the present invention includes the following components (in wt.-%):

| Component | Proportion (% by weight) |
|---|---|
| $SiO_2$ | 50-80 |
| $Al_2O_3$ | 0-10 |
| $B_2O_3$ | 0-15 |
| $Li_2O$ | 0-20 |
| $Na_2O$ | 0-20 |
| $K_2O$ | 0-25 |
| BaO | 0-10 |
| CaO | 0-10 |
| MgO | 0-10 |
| ZnO | 0-10 |
| $La_2O_3$ | 0-20 |
| $TiO_2$ | 0-5 |
| Cl | 0-3 |
| $MnO_2$ | 1.0-5.0 |
| $Cr_2O_3$ | 0.2-3.0 | wherein the sum of the proportions of $Li_2O$, $Na_2O$ and $K_2O$ is in a range of from 5.0 to 30.0 wt.-%, wherein the sum of the amounts of $MnO_2$ and $Cr_2O_3$ is at least 2.7 wt.-%, and wherein the ratio of the proportions of $MnO_2$ (in wt.-%) and $Cr_2O_3$ (in wt.-%) is in a range of from 1.5:1 to 12.5:1.

$MnO_2$ and $Cr_2O_3$ in the respective amounts and ratio are advantageous for achieving a broad absorption spectrum covering a particular broad range of wavelengths. In particular, without wishing to be bound by a certain theory, there may be an interplay between the amounts and ratio of $MnO_2$ and $Cr_2O_3$ that has an influence on the oxidation states of manganese and chromium in the glass. If the amount of $MnO_2$ is too large, Cr(VI) may be formed in relevant amounts which is to be avoided for the reasons described above. However, if the amount of $MnO_2$ is too low, the desired broad absorption spectrum may not be achieved. Therefore, it is advantageous to keep the amounts and ratio of $MnO_2$ and $Cr_2O_3$ as described above.

The glasses of the present invention optionally include $SiO_2$ in an amount of from 50.0 wt.-% to 80.0 wt.-%, optionally from 55.0 wt.-% to 75.0 wt.-%, optional from 60.0 wt.-% to 73.0 wt.-%. $SiO_2$ is particularly advantageous with respect to the desired chemical resistance and stability as well as the ability of the glass to be processed by hot forming. The amount of $SiO_2$ may for example be at least 50.0 wt.-%, at least 55.0 wt.-%, or at least 60.0 wt.-%. The amount of $SiO_2$ may for example be at most 80.0 wt.-%, at most 75.0 wt.-%, at most 73.0 wt.-%, or at most 70.0 wt.-%. Adding further components is advantageous for example with respect to meltability and refinability so that the amount of $SiO_2$ should be limited.

The glasses of the present invention include alkali metal oxides. This is particularly advantageous for meltability and for refining properties. Optionally, the sum of the amounts of $Li_2O$, $Na_2O$ and $K_2O$ in the glasses of the present invention is from 5.0 wt.-% to 30.0 wt.-%, optionally from 10.0 wt.-% to 25.0 wt.-%, for example from 15.0 to 20.0 wt.-%. The sum of the amounts of $Li_2O$, $Na_2O$ and $K_2O$ may for example be at least 5.0 wt.-%, at least 10.0 wt.-%, or at least 15.0 wt.-%. As described below, the glasses of the present invention may include $Cr_2O_3$ in comparably large amounts. Alkali metal oxides are particularly advantageous for dissolving $Cr_2O_3$ in the glass melt in order to avoid insoluble chromate salts. Furthermore, the absorption properties of the coloring oxides may be influenced by the amount alkali metal oxides as well. If the amount of alkali metal oxides is very low, undesired absorption bands may occur in the NIR range. However, on the other hand, if alkali metals are used in large amounts, the chemical resistance may be reduced. Furthermore, alkali metals may have a negative influence on the mechanical resistance of the glass. The sum of the amounts of $Li_2O$, $Na_2O$ and $K_2O$ may for example be at most 30.0 wt.-%, at most 25.0 wt.-%, or at most 20.0 wt.-%.

In some embodiments, the sum of the amounts of $Na_2O$ and $K_2O$ in the glasses of the invention is from 5.0 wt.-% to 30.0 wt.-%, optionally from 10.0 wt.-% to 25.0 wt.-%, for example from 15.0 to 20.0 wt.-%. The sum of the amounts of $Na_2O$ and $K_2O$ may for example be at least 5.0 wt.-%, at least 10.0 wt.-%, or at least 15.0 wt.-%. The sum of the amounts of $Na_2O$ and $K_2O$ may for example be at most 30.0 wt.-%, at most 25.0 wt.-%, or at most 20.0 wt.-%.

In some embodiments, the sum of the amounts of $Li_2O$ and $K_2O$ in the glasses of the present invention is from 5.0 wt.-% to 30.0 wt.-%, optionally from 10.0 wt.-% to 25.0 wt.-%, for example from 15.0 to 20.0 wt.-%. The sum of the amounts of $Li_2O$ and $K_2O$ may for example be at least 5.0 wt.-%, at least 10.0 wt.-%, or at least 15.0 wt.-%. The sum of the amounts of $Li_2O$ and $K_2O$ may for example be at most 30.0 wt.-%, at most 25.0 wt.-%, or at most 20.0 wt.-%.

The glasses of the present invention may for example include $Li_2O$ in an amount of from 0 to 20.0 wt.-%, for example from 3.0 to 18.0 wt.-%, from 4.0 to 16.0 wt.-%, from 5.0 to 15.0 wt.-%, from 6.0 to 12.0 wt.-%, or from 7.0 to 10.0 wt.-%. The amount of $Li_2O$ may for example be at least 3.0 wt.-%, at least 4.0 wt.-%, at least 5.0 wt.-%, at least 6.0 wt.-%, or at least 7.0 wt.-%. The amount of $Li_2O$ may for example be at most 20.0 wt.-%, at most 18.0 wt.-%, at most 16.0 wt.-%, at most 15.0 wt.-%, at most 12.0 wt.-%, or at most 10.0 wt.-%. In some embodiments, the amount of $Li_2O$ is at most 5.0 wt.-%, at most 3.0 wt.-%, at most 2.0 wt.-%, at most 1.0 wt.-%, at most 0.5 wt.-%, at most 0.2 wt.-%, at most 0.1 wt.-%, or the glasses are even free of $Li_2O$.

The glasses of the present invention may for example include $Na_2O$ in an amount of from 0 to 20.0 wt.-%, for example from 3.0 to 18.0 wt.-%, from 4.0 to 16.0 wt.-%, from 5.0 to 15.0 wt.-%, from 6.0 to 12.0 wt.-%, or from 7.0 to 10.0 wt.-%. The amount of $Na_2O$ may for example be at least 3.0 wt.-%, at least 4.0 wt.-%, at least 5.0 wt.-%, at least 6.0 wt.-%, or at least 7.0 wt.-%. The amount of $Na_2O$ may for example be at most 20.0 wt.-%, at most 18.0 wt.-%, at most 16.0 wt.-%, at most 15.0 wt.-%, at most 12.0 wt.-%, or at most 10.0 wt.-%. In some embodiments, the amount of $Na_2O$ is at most 1.0 wt.-%, at most 0.5 wt.-%, at most 0.2 wt.-%, at most 0.1 wt.-%, or the glasses are even free of $Na_2O$.

The amount of $K_2O$ in the glasses of the present invention may for example be from 0 to 25.0 wt.-%, for example from 1.0 to 20.0 wt.-%, from 2.0 to 15.0 wt.-%, from 5.0 to 13.0 wt.-%, or from 8.0 to 12.0 wt.-%. The amount of $K_2O$ may for example be at least 1.0 wt.-%, at least 2.0 wt.-%, at least 5.0 wt.-%, or at least 8.0 wt.-%. The amount of $K_2O$ may for example be at most 25.0 wt.-%, at most 20.0 wt.-%, at most 15.0 wt.-%, at most 13.0 wt.-%, or at most 12.0 wt.-%. In some embodiments, the amount of $K_2O$ is at most 1.0 wt.-%, at most 0.5 wt.-%, at most 0.2 wt.-%, at most 0.1 wt.-%, or the glasses are even free of $K_2O$.

In some embodiments, the glasses of the present invention include both $Na_2O$ and $K_2O$, optionally each in an amount of from 1.0 to 20.0 wt.-%, for example from 2.0 to 15.0 wt.-%. In some embodiments, the glasses of the present invention include both $Li_2O$ and $K_2O$, optionally each in an amount of from 1.0 to 20.0 wt.-%, for example from 2.0 to 15.0 wt.-%.

In some embodiments, the ratio of the amount of $K_2O$ (in wt.-%) and the amount of $Na_2O$ (in wt.-%) is in a range of from 0.5:1 to 2.0:1, optionally from 0.55:1 to 1.75:1, optionally from 0.6:1 to 1.5:1, optionally from 0.65:1 to 1.35:1, optionally from 0.7:1 to 1.3:1, optionally from 0.75:1 to 1.25:1, optionally from 0.8:1 to 1.2:1. In some embodiments, the amount of $K_2O$ in the glasses of the present invention is higher than the amount of $Na_2O$. In other embodiments, the amount of $Na_2O$ in the glasses of the invention is higher than the amount of $K_2O$.

In some embodiments, the ratio of the amount of $K_2O$ (in wt.-%) and the amount of $Li_2O$ (in wt.-%) is in a range of from 0.5:1 to 2.0:1, optionally from 0.55:1 to 1.75:1, optionally from 0.6:1 to 1.5:1, optionally from 0.65:1 to 1.35:1, optionally from 0.7:1 to 1.3:1, optionally from 0.75:1 to 1.25:1, optionally from 0.8:1 to 1.2:1. In some embodiments, the amount of $K_2O$ in the glasses of the present invention is higher than the amount of $Li_2O$. In other embodiments, the amount of $Li_2O$ in the glasses of the invention is higher than the amount of $K_2O$.

The glasses of the present invention may include $B_2O_3$. This component is advantageous for increasing chemical resistance. Furthermore, $B_2O_3$ is also advantageous for increasing the mechanical resistance. However, high amounts of $B_2O_3$ may be associated with decreased NIR transmittance as the absorption bands of $Cr_2O_3$ may be shifted. The amount of $B_2O_3$ in the glasses of the present invention may for example be from 0 to 15.0 wt.-%, from 1.0 to 12.0 wt.-%, from 2.0 to 10.0 wt.-%, from 3.0 to 8.0 wt.-%, from 4.0 to 7.0 wt.-%, or from 5.0 to 6.0 wt.-%. The amount of $B_2O_3$ may for example be at least 1.0 wt.-%, at least 2.0 wt.-%, at least 3.0 wt.-%, at least 4.0 wt.-%, or at least 5.0 wt.-%. The amount of $B_2O_3$ may for example be at most 15.0 wt.-%, at most 12.0 wt.-%, at most 10.0 wt.-%, at most 8.0 wt.-%, at most 7.0 wt.-%, or at most 6.0 wt.-%. In some embodiments, the amount of $B_2O_3$ is at most 1.0 wt.-%, at most 0.5 wt.-%, at most 0.2 wt.-%, at most 0.1 wt.-%, or the glasses are even free of $B_2O_3$.

The glasses of the present invention may include $Al_2O_3$. This component is advantageous for increasing chemical resistance. However, $Al_2O_3$ may be associated with decreased NIR transmittance as the absorption bands of $Cr_2O_3$ may be shifted. The amount of $Al_2O_3$ in the glasses of the present invention may for example be from 0 to 10.0 wt.-%, from 1.0 to 8.0 wt.-%, or from 2.0 to 6.0 wt.-%. The amount of $Al_2O_3$ may for example be at least 1.0 wt.-%, or at least 2.0 wt.-%. The amount of $Al_2O_3$ may for example be at most 10.0 wt.-%, at most 8.0 wt.-%, or at most 6.0 wt.-%. In some embodiments, the amount of $Al_2O_3$ is at most 1.0 wt.-%, at most 0.5 wt.-%, at most 0.2 wt.-%, at most 0.1 wt.-%, or the glasses are even free of $Al_2O_3$.

In some embodiments, the sum of the amounts of $B_2O_3$ and $Al_2O_3$ in the glasses of the present invention is from 10.0 wt.-% to 30.0 wt.-%. In other embodiments, the sum of the amounts of $B_2O_3$ and $Al_2O_3$ is from 2.0 to <10.0 wt.-%, from 3.0 to 8.0 wt.-%, from 4.0 to 7.0 wt.-%, or from 5.0 to 6.0 wt.-%. The sum of the amounts of $B_2O_3$ and $Al_2O_3$ may for example be at least 1.0 wt.-%, at least 2.0 wt.-%, at least 3.0 wt.-%, at least 4.0 wt.-%, or at least 5.0 wt.-%. The sum of the amounts of $B_2O_3$ and $Al_2O_3$ may for example be at most 15.0 wt.-%, at most 12.0 wt.-%, at most 10.0 wt.-%, at most 8.0 wt.-%, at most 7.0 wt.-%, or at most 6.0 wt.-%. In some embodiments, sum of the amounts of $B_2O_3$ and $Al_2O_3$ is at most 1.0 wt.-%, at most 0.5 wt.-%, at most 0.2 wt.-%, at most 0.1 wt.-%, or the glasses are even free of $B_2O_3$ and $Al_2O_3$.

The glasses of the present invention may include BaO. The amount of BaO may for example be from 0 to 10.0 wt.-%, from 1.0 to 8.0 wt.-%, from 2.0 to 6.0 wt.-%, or from 3.0 to 5.0 wt.-%. The amount of BaO may for example be at least 1.0 wt.-%, at least 2.0 wt.-%, or at least 3.0 wt.-%. The amount of BaO may for example be at most 10.0 wt.-%, at most 8.0 wt.-%, at most 6.0 wt.-%, or at most 5.0 wt.-%. In some embodiments, the amount of BaO is at most 1.0 wt.-%, at most 0.5 wt.-%, at most 0.2 wt.-%, at most 0.1 wt.-%, or the glasses are even free of BaO.

The glasses of the present invention may include CaO. The amount of CaO may for example be from 0 to 10.0 wt.-%, from 1.0 to 8.0 wt.-%, from 2.0 to 6.0 wt.-%, or from 3.0 to 5.0 wt.-%. The amount of CaO may for example be at least 1.0 wt.-%, at least 2.0 wt.-%, or at least 3.0 wt.-%. The amount of CaO may for example be at most 10.0 wt.-%, at most 8.0 wt.-%, at most 6.0 wt.-%, or at most 5.0 wt.-%. In some embodiments, the amount of CaO is at most 1.0 wt.-%, at most 0.5 wt.-%, at most 0.2 wt.-%, at most 0.1 wt.-%, or the glasses are even free of CaO.

The glasses of the present invention may include MgO. The amount of MgO may for example be from 0 to 10.0 wt.-%, from 1.0 to 8.0 wt.-%, from 2.0 to 6.0 wt.-%, or from 3.0 to 5.0 wt.-%. The amount of MgO may for example be at least 1.0 wt.-%, at least 2.0 wt.-%, or at least 3.0 wt.-%. The amount of MgO may for example be at most 10.0 wt.-%, at most 8.0 wt.-%, at most 6.0 wt.-%, or at most 5.0 wt.-%. In some embodiments, the amount of MgO is at most 1.0 wt.-%, at most 0.5 wt.-%, at most 0.2 wt.-%, at most 0.1 wt.-%, or the glasses are even free of MgO.

The glasses of the present invention may include ZnO. The amount of ZnO may for example be from 0 to 10.0 wt.-%, from 1.0 to 8.0 wt.-%, from 2.0 to 6.0 wt.-%, or from 3.0 to 5.0 wt.-%. The amount of ZnO may for example be at least 1.0 wt.-%, at least 2.0 wt.-%, or at least 3.0 wt.-%. The amount of ZnO may for example be at most 10.0 wt.-%, at most 8.0 wt.-%, at most 6.0 wt.-%, or at most 5.0 wt.-%. In some embodiments, the amount of ZnO is at most 1.0 wt.-%, at most 0.5 wt.-%, at most 0.2 wt.-%, at most 0.1 wt.-%, or the glasses are even free of ZnO.

The glasses of the present invention may include $La_2O_3$. Optionally, the amount of $La_2O_3$ in the glasses of the invention is from 0 to 20.0 wt.-%, for example from 1.0 to 15.0 wt.-%, from 2.0 to 12.0 wt.-%, or from 5.0 to 10.0 wt.-%. The amount of $La_2O_3$ may for example be at least 1.0 wt.-%, at least 2.0 wt.-%, or at least 5.0 wt.-%. The amount of $La_2O_3$ may for example be at most 20.0 wt.-%, at most 15.0 wt.-%, at most 12.0 wt.-%, or at most 10.0 wt.-%. In some embodiments, the amount of $La_2O_3$ is at most 1.0 wt.-%, at most 0.5 wt.-%, at most 0.2 wt.-%, at most 0.1 wt.-%, or the glasses are even free of $La_2O_3$.

The glasses of the present invention may include $TiO_2$. The amount of $TiO_2$ may for example be from 0 to 5.0 wt.-%, from 0.5 to 4.0 wt.-%, from 1.0 to 3.0 wt.-%, or from 1.5 to 2.5 wt.-%. The amount of $TiO_2$ may for example be at least 0.5 wt.-%, at least 1.0 wt.-%, or at least 1.5 wt.-%. The amount of $TiO_2$ may for example be at most 5.0 wt.-%, at most 4.0 wt.-%, at most 3.0 wt.-%, or at most 2.5 wt.-%. In some embodiments, the amount of $TiO_2$ is at most 1.0 wt.-%, at most 0.5 wt.-%, at most 0.2 wt.-%, at most 0.1 wt.-%, or the glasses are even free of $TiO_2$.

Refining agents such as Cl or $Sb_2O_3$ may be used. $As_2O_3$ is optionally avoided.

The glasses of the present invention may include $Sb_2O_3$. The amount of $Sb_2O_3$ in the glasses of the invention may for example be from 0 to 1.0 wt.-%, for example from 0.1 to 0.7 wt.-%, or from 0.2 to 0.5 wt.-%. The amount of $Sb_2O_3$ may for example be at least 0.1 wt.-%, or at least 0.2 wt.-%. The amount of $Sb_2O_3$ may for example be at most 1.0 wt.-%, at most 0.7 wt.-%, or at most 0.5 wt.-%. In some embodiments, the amount of $Sb_2O_3$ is at most 0.2 wt.-%, at most 0.1 wt.-%, or the glasses are even free of $Sb_2O_3$.

The glasses of the present invention may include Cl. In one aspect of the invention, Cl is an optional refining agent. In one aspect, Cl may be used for controlling the water content and thereby controlling the NIR transmittance, in particular at the relevant wavelength ranges of the invention, for example the range from 1500 to 1600 nm, such as at a wavelength of 1550 nm. Water may negatively affect NIR transmittance due to non-desired absorption bands. Furthermore, water may also cause undesired bubbles in the glass, in particular upon cooling. Thus, refining with other refining agents is not effective in avoiding water-caused bubbles because the bubbles form after the refining step. In contrast, Cl refining eliminates protons ($H^+$) from the glass and thereby reduces the water content so that the formation of water-caused bubbles upon cooling after the refining step is significantly reduced.

Optionally, the amount of Cl in the glasses of the present invention is from 0 to 3.0 wt.-%, for example from 0.1 to 2.0 wt.-%, from 0.2 to 1.0 wt.-%, or from 0.3 to 0.5 wt.-%. The amount of Cl may for example be at least 0.1 wt.-%, at least 0.2 wt.-%, or at least 0.3 wt.-%. The amount of Cl may for example be at most 3.0 wt.-%, at most 2.0 wt.-%, at most 1.0 wt.-%, or at most 0.5 wt.-%. In some embodiments, the amount of Cl is at most 0.2 wt.-%, at most 0.1 wt.-%, or the glasses are even free of Cl.

The glasses of the present invention include $MnO_2$ and $Cr_2O_3$, in particular for adapting optical properties such as transmittance. Optionally, the glasses are free of other coloring components such as NiO and CoO.

Optionally the amount of $MnO_2$ in the glasses of the present invention is from 0.2 to 5.0 wt.-%, for example from 0.3 to 4.5 wt.-%, from 0.5 to 4.0 wt.-%, or from 1.0 to 3.5 wt.-%. The amount of $MnO_2$ may for example be at least 0.2 wt.-%, at least 0.3 wt.-%, at least 0.5 wt.-%, or at least 1.0 wt.-%. The amount of $MnO_2$ may for example be at most 5.0 wt.-%, at most 4.5 wt.-%, at most 4.0 wt.-%, or at most 3.5 wt.-%.

In one embodiment the amount of $MnO_2$ in the glasses of the present invention is from 0.2 to 3.0 wt.-%, for example from 0.3 to 2.5 wt.-%, from 0.5 to 2.0 wt.-%, or from 1.0 to 1.7 wt.-%. The amount of $MnO_2$ may for example be at least 0.2 wt.-%, at least 0.3 wt.-%, at least 0.5 wt.-%, or at least 1.0 wt.-%. The amount of $MnO_2$ may for example be at most 3.0 wt.-%, at most 2.5 wt.-%, at most 2.0 wt.-%, or at most 1.7 wt.-%.

In one embodiment, the amount of $MnO_2$ in the glasses of the present invention is from 1.0 to 5.0 wt.-%, for example from 1.5 to 4.5 wt.-%, from 2.0 to 4.0 wt.-%, or from 2.5 to 3.5 wt.-%. The amount of $MnO_2$ may for example be at least 1.0 wt.-%, at least 1.5 wt.-%, at least 2.0 wt.-%, or at least 2.5 wt.-%. The amount of $MnO_2$ may for example be at most 5.0 wt.-%, at most 4.5 wt.-%, at most 4.0 wt.-%, or at most 3.5 wt.-%.

Optionally, the amount of $Cr_2O_3$ in the glasses of the present invention is from 0.05 to 3.0 wt.-%, for example from 0.1 to 2.5 wt.-%, from 0.15 to 2.0 wt.-%, or from 0.2 to 1.5 wt.-%. The amount of $Cr_2O_3$ may for example be at least 0.05 wt.-%, at least 0.1 wt.-%, at least 0.15 wt.-%, or at least 0.2 wt.-%. The amount of $Cr_2O_3$ may for example be at most 3.0 wt.-%, at most 2.5 wt.-%, at most 2.0 wt.-%, or at most 1.5 wt.-%.

In one embodiment, the amount of $Cr_2O_3$ in the glasses of the present invention is from 0.05 to 2.0 wt.-%, for example from 0.1 to 1.5 wt.-%, from 0.15 to 1.0 wt.-%, or from 0.2 to 0.8 wt.-%. The amount of $Cr_2O_3$ may for example be at least 0.05 wt.-%, at least 0.1 wt.-%, at least 0.15 wt.-%, or at least 0.2 wt.-%. The amount of $Cr_2O_3$ may for example be at most 2.0 wt.-%, at most 1.5 wt.-%, at most 1.0 wt.-%, or at most 0.8 wt.-%.

In one embodiment, the amount of $Cr_2O_3$ in the glasses of the present invention is from 0.2 to 3.0 wt.-%, for example from 0.5 to 2.5 wt.-%, from 0.7 to 2.0 wt.-%, or from 1.0 to 1.5 wt.-%. The amount of $Cr_2O_3$ may for example be at least 0.2 wt.-%, at least 0.5 wt.-%, at least 0.7 wt.-%, or at least 1.0 wt.-%. The amount of $Cr_2O_3$ may for example be at most 3.0 wt.-%, at most 2.5 wt.-%, at most 2.0 wt.-%, or at most 1.5 wt.-%.

The sum of the amounts of $MnO_2$ and $Cr_2O_3$ may for example be from 0.3 to 8.0 wt.-%, from 0.4 to 7.0 wt.-%, from 0.5 to 6.0 wt.-%, or from 0.6 to 5.5 wt.-%. The sum of the amounts of $MnO_2$ and $Cr_2O_3$ may for example be at least 0.3 wt.-%, at least 0.4 wt.-%, at least 0.5 wt.-%, or at least 0.6 wt.-%. The sum of the amounts of $MnO_2$ and $Cr_2O_3$ may for example be at most 8.0 wt.-%, at most 7.0 wt.-%, at most 6.0 wt.-%, or at most 5.5 wt.-%.

In one embodiment, the sum of the amounts of $MnO_2$ and $Cr_2O_3$ may for example be from 0.3 to 3.5 wt.-%, from 0.4 to 3.0 wt.-%, from 0.5 to 2.5 wt.-%, or from 0.6 to 2.3 wt.-%. The sum of the amounts of $MnO_2$ and $Cr_2O_3$ may for example be at least 0.3 wt.-%, at least 0.4 wt.-%, at least 0.5 wt.-%, or at least 0.6 wt.-%. The sum of the amounts of $MnO_2$ and $Cr_2O_3$ may for example be at most 3.5 wt.-%, at most 3.0 wt.-%, at most 2.5 wt.-%, or at most 2.3 wt.-%.

In one embodiment, the sum of the amounts of $MnO_2$ and $Cr_2O_3$ may for example be from 2.7 to 8.0 wt.-%, from 3.0 to 7.0 wt.-%, from 3.2 to 6.0 wt.-%, or from 3.5 to 5.5 wt.-%. The sum of the amounts of $MnO_2$ and $Cr_2O_3$ may for example be at least 2.7 wt.-%, at least 3.0 wt.-%, at least 3.2 wt.-%, or at least 3.5 wt.-%. The sum of the amounts of $MnO_2$ and $Cr_2O_3$ may for example be at most 8.0 wt.-%, at most 7.0 wt.-%, at most 6.0 wt.-%, or at most 5.5 wt.-%.

The ratio of the proportions of $MnO_2$ (in wt.-%) and $Cr_2O_3$ (in wt.-%) may for example be in a range of from 1.5:1 to 12.5:1, from 1.6:1 to 10.0:1, from 1.7:1 to 7.5:1, from 1.8:1 to 5.0:1, from 1.9:1 to 4.0:1, from 1.95:1 to 3.5:1, or from 2.0:1 to 3.0:1. The ratio of the proportions of $MnO_2$ (in wt.-%) and $Cr_2O_3$ (in wt.-%) may for example be at least 1.5:1, at least 1.6:1, at least 1.7:1, at least 1.8:1, at least 1.9:1, at least 1.95:1, or at least 2.0:1. The ratio of the proportions of $MnO_2$ (in wt.-%) and $Cr_2O_3$ (in wt.-%) may for example be at most 12.5:1, at most 10.0:1, at most 7.5:1, at most 5.0:1, at most 4.0:1, at most 3.5:1, or at most 3.0:1.

PbO is a component that is optionally avoided, in particular for applications in the automotive field. Optionally, the amount of PbO in the glasses of the present invention is at most 1.0 wt.-%, at most 0.5 wt.-%, at most 0.2 wt.-%, at most 0.1 wt.-%, or the glasses are most optionally free of PbO.

$V_2O_5$ is a component that is optionally avoided, in particular for applications in the automotive field. Optionally, the amount of $V_2O_5$ in the glasses of the present invention is at most 1.0 wt.-%, at most 0.5 wt.-%, at most 0.2 wt.-%, at most 0.1 wt.-%, or the glasses are optionally free of $V_2O_5$.

CdO is a component that is optionally avoided, in particular for applications in the automotive field. Optionally, the amount of CdO in the glasses of the present invention is at most 1.0 wt.-%, at most 0.5 wt.-%, at most 0.2 wt.-%, at most 0.1 wt.-%, or the glasses are most optionally free of CdO.

Optionally, the amount of $ZrO_2$ in the glasses of the present invention is at most 1.0 wt.-%, at most 0.5 wt.-%, at most 0.2 wt.-%, at most 0.1 wt.-%, or the glasses are optionally free of $ZrO_2$.

Optionally, the amount of SrO in the glasses of the present invention is at most 1.0 wt.-%, at most 0.5 wt.-%, at most 0.2 wt.-%, at most 0.1 wt.-%, or the glasses are optionally free of SrO.

Optionally, the amount of $Fe_2O_3$ in the glasses of the present invention is at most 1.0 wt.-%, at most 0.5 wt.-%, at most 0.2 wt.-%, at most 0.1 wt.-%, or the glasses are optionally free of $Fe_2O_3$.

When in this description it is mentioned that the glasses are free of a component or that they do not contain a certain component, then this means that this component is only allowed to be present as an impurity in the glasses. This means that it is not added in substantial amounts. Not substantial amounts are amounts of less than 300 ppm (by weight), optionally less than 200 ppm (by weight), optionally less than 100 ppm (by weight), optionally less than 50 ppm (by weight) and optionally less than 10 ppm (by weight).

Optionally, the glass of the present invention consists to at least 90 wt.-%, optionally at least 95 wt.-%, optionally at least 98 wt.-%, optionally to at least 99 wt.-%, optionally to at least 99.5 wt.-% of $SiO_2$, $MnO_2$, $Cr_2O_3$, one or more of the alkali metal oxides $Li_2O$, $Na_2O$, $K_2O$, and one or more of the following components: $Al_2O_3$, $B_2O_3$, BaO, CaO, MgO, ZnO, $La_2O_3$, $TiO_2$, Cl, $Sb_2O_3$.

In one aspect, the glass of the present invention includes the following components (in wt.-%):

| Component | Proportion (% by weight) |
| --- | --- |
| $SiO_2$ | 50-80 |
| $Al_2O_3$ | 0-10 |
| $B_2O_3$ | 0-15 |
| $Li_2O$ | 0-20 |
| $Na_2O$ | 0-20 |
| $K_2O$ | 0-25 |
| BaO | 0-10 |
| CaO | 0-10 |
| MgO | 0-10 |
| ZnO | 0-10 |
| $La_2O_3$ | 0-20 |
| $TiO_2$ | 0-5 |
| Cl | 0-3 |
| $MnO_2$ | 0.2-5.0 |
| $Cr_2O_3$ | 0.05-3.0 |

In one aspect, the glass of the present invention includes the following components (in wt.-%):

| Component | Proportion (% by weight) |
| --- | --- |
| $SiO_2$ | 50-80 |
| $Al_2O_3$ | 0-10 |
| $B_2O_3$ | 0-15 |
| $Li_2O$ | 0-20 |
| $Na_2O$ | 0-20 |
| $K_2O$ | 0-25 |
| BaO | 0-10 |
| CaO | 0-10 |
| MgO | 0-10 |
| ZnO | 0-10 |
| $La_2O_3$ | 0-20 |
| $TiO_2$ | 0-5 |
| Cl | 0-3 |
| $MnO_2$ | 1.0-5.0 |
| $Cr_2O_3$ | 0.2-3.0 |

In one aspect, the glass of the present invention includes the following components (in wt.-%):

| Component | Proportion (% by weight) |
| --- | --- |
| $SiO_2$ | 50-80 |
| $Al_2O_3$ | 0-10 |
| $B_2O_3$ | 0-15 |
| $Li_2O$ | 0-20 |
| $Na_2O$ | 0-20 |
| $K_2O$ | 0-25 |
| BaO | 0-10 |
| CaO | 0-10 |
| MgO | 0-10 |
| ZnO | 0-10 |
| $La_2O_3$ | 0-20 |
| $TiO_2$ | 0-5 |
| Cl | 0-3 |
| $MnO_2$ | 0.2-3.0 |
| $Cr_2O_3$ | 0.05-2.0 |

In one aspect, the glass of the present invention includes the following components (in wt.-%):

| Component | Proportion (% by weight) |
| --- | --- |
| $SiO_2$ | 55-75 |
| $Al_2O_3$ | 0-8 |
| $B_2O_3$ | 0-12 |
| $Li_2O$ | 0-18 |
| $Na_2O$ | 0-18 |
| $K_2O$ | 0-20 |
| BaO | 0-8 |
| CaO | 0-8 |

-continued

| Component | Proportion (% by weight) |
|---|---|
| MgO | 0-8 |
| ZnO | 0-8 |
| $La_2O_3$ | 0-15 |
| $TiO_2$ | 0-4 |
| Cl | 0-2 |
| $MnO_2$ | 0.3-4.5 |
| $Cr_2O_3$ | 0.1-2.5 |

In one aspect, the glass of the present invention includes the following components (in wt.-%):

| Component | Proportion (% by weight) |
|---|---|
| $SiO_2$ | 55-75 |
| $Al_2O_3$ | 0-8 |
| $B_2O_3$ | 0-12 |
| $Li_2O$ | 0-18 |
| $Na_2O$ | 0-18 |
| $K_2O$ | 0-20 |
| BaO | 0-8 |
| CaO | 0-8 |
| MgO | 0-8 |
| ZnO | 0-8 |
| $La_2O_3$ | 0-15 |
| $TiO_2$ | 0-4 |
| Cl | 0-2 |
| $MnO_2$ | 0.3-2.5 |
| $Cr_2O_3$ | 0.1-1.5 |

In one aspect, the glass of the present invention includes the following components (in wt.-%):

| Component | Proportion (% by weight) |
|---|---|
| $SiO_2$ | 55-75 |
| $Al_2O_3$ | 0-8 |
| $B_2O_3$ | 0-12 |
| $Li_2O$ | 0-18 |
| $Na_2O$ | 0-18 |
| $K_2O$ | 0-20 |
| BaO | 0-8 |
| CaO | 0-8 |
| MgO | 0-8 |
| ZnO | 0-8 |
| $La_2O_3$ | 0-15 |
| $TiO_2$ | 0-4 |
| Cl | 0-2 |
| $MnO_2$ | 1.5-4.5 |
| $Cr_2O_3$ | 0.5-2.5 |

In one aspect, the glass of the present invention includes the following components (in wt.-%):

| Component | Proportion (% by weight) |
|---|---|
| $SiO_2$ | 60-73 |
| $Al_2O_3$ | 0-6 |
| $B_2O_3$ | 0-12 |
| $Li_2O$ | 0-16 |
| $Na_2O$ | 0-16 |
| $K_2O$ | 0-15 |
| BaO | 0-6 |
| CaO | 0-6 |
| MgO | 0-6 |
| ZnO | 0-6 |
| $La_2O_3$ | 0-12 |
| $TiO_2$ | 0-3 |
| Cl | 0-1 |
| $MnO_2$ | 0.5-4.0 |
| $Cr_2O_3$ | 0.15-2.0 |

In one aspect, the glass of the present invention includes the following components (in wt.-%):

| Component | Proportion (% by weight) |
|---|---|
| $SiO_2$ | 60-73 |
| $Al_2O_3$ | 0-6 |
| $B_2O_3$ | 0-12 |
| $Li_2O$ | 0-16 |
| $Na_2O$ | 0-16 |
| $K_2O$ | 0-15 |
| BaO | 0-6 |
| CaO | 0-6 |
| MgO | 0-6 |
| ZnO | 0-6 |
| $La_2O_3$ | 0-12 |
| $TiO_2$ | 0-3 |
| Cl | 0-1 |
| $MnO_2$ | 0.5-2.0 |
| $Cr_2O_3$ | 0.15-1.0 |

In one aspect, the glass of the present invention includes the following components (in wt.-%):

| Component | Proportion (% by weight) |
|---|---|
| $SiO_2$ | 60-73 |
| $Al_2O_3$ | 0-6 |
| $B_2O_3$ | 0-12 |
| $Li_2O$ | 0-16 |
| $Na_2O$ | 0-16 |
| $K_2O$ | 0-15 |
| BaO | 0-6 |
| CaO | 0-6 |
| MgO | 0-6 |
| ZnO | 0-6 |
| $La_2O_3$ | 0-12 |
| $TiO_2$ | 0-3 |
| Cl | 0-1 |
| $MnO_2$ | 2.0-4.0 |
| $Cr_2O_3$ | 0.7-2.0 |

The glass of the present invention is optionally used as an optical window for LiDAR systems. Such optical windows provide protection against environmental impacts for the opto-electronic components of the system. Depending on the type of LiDAR system, such optical windows may be planar or curved. Commonly used are also spinning LiDAR systems in which emitter and detector rotate within a typically stationary ring window.

LiDAR systems generally work by emitting laser light in the NIR spectrum, in particular having wavelengths of more than 780 nm, in particular more than 1000 nm, such as from 1250 to 1350 nm or from 1500 to 1600 nm. Therefore, it is important for such applications that the glass has a high transmittance in the NIR range in order for the laser light to pass. On the other hand, the glass should have a low transmittance for visible light in order to prevent visibility of structures positioned behind the glass.

There have been attempts to achieve such optical properties by way of a coating that blocks transmittance of visible light. However, coatings are a safety risk, in particular in the automotive sector. Furthermore, coating of round-shaped glass sheets is complicated and associated with high costs due to the angular dependence of blocking of light. Many coatings are also less effective. Therefore, it would be advantageous to achieve the desired properties of low transmittance in the visible range and high transmittance in the NIR range with the glass itself, i.e. without the need for any light blocking coatings.

Furthermore, a neutrally black color impression is often desired but not achieved sufficiently by the prior art. In particular, it has been desired to achieve a neutrally black color impression at a comparably low glass thickness in order to lower the weight of the glass products.

A further lowering of weight can also be achieved by using low density glasses. Optionally, the glasses of the present invention have a low density.

The refractive index $n_d$ of the glasses of the present invention is optionally in a range of from 1.50 to 1.55, for example from 1.50 to 1.53 such as from 1.50 to 1.51 or from 1.52 to 1.53. The refractive index $n_d$ of the glasses of the present invention may for example be at least 1.50, at least 1.51, or at least 1.52. The refractive index $n_d$ of the glasses of the invention may for example be at most 1.55, at most 1.54, at most 1.53, at most 1.52, or at most 1.51. The refractive index $n_d$ is optionally determined using reference glasses without coloring components.

The glasses of the present invention are highly advantageous in several aspects. They have advantageous spectral properties such as low transmittance in the visible range, high transmittance in the NIR range and for the specific application a sufficient neutrally black color impression. Furthermore, they have a very good chemical resistance and climate resistance and solarization resistance which makes them particularly useful for outdoor applications. Moreover, the glasses have a good meltability and they can be processed well by hot forming processes. The latter is due to the long viscosity profile of the glasses. This means that the viscosity does not vary so much with differing temperatures. Glasses having a long viscosity profile are advantageous for hot forming because these glasses have a greater temperature range at which they can be processed. Thus, the process does not have to be aimed at the fastest possible processing of the still hot glass.

When the term "transmittance" is mentioned in the present disclosure, this refers to the total transmittance if not indicated otherwise, i.e. the transmittance as measured taking into account both absorptive losses and reflective losses. If on the other hand the internal transmittance is addressed, this is clearly indicated herein by referring to the "internal transmittance". The internal transmittance is determined as the ratio of the total transmittance and the $P_d$ value. The $P_d$ value represents a measure of reflective losses and can easily be calculated based on the refractive index $n_d$ using the following formula.

$$P_d = \frac{2 \cdot n_d}{n_d^2 + 1}$$

For example, for a glass having a refractive index $n_d$ of 1.515, the $P_d$ value is about 0.92. This means that an internal transmittance of 100% would result in a total transmittance of about 92%. Notably, reflective losses may be reduced using anti-reflective coatings (AR coatings) so that the total transmittance may be increased beyond 92%. However, within the present disclosure the term "transmittance" refers to the total transmittance of glass samples without any AR coatings.

Optionally, the glasses of the present invention have $P_d$ value in the range of from 0.911 to 0.925, optionally from 0.915 to 0.924, for example from 0.920 to 0.923 or from 0.916 to 0.919. The glasses of the present invention may for example have a $P_d$ value of at least 0.911, at least 0.912, at least 0.913, at least 0.914, at least 0.915, or at least 0.916. The glasses of the invention may for example have a $P_d$ value of at most 0.925, at most 0.924, at most 0.923, at most 0.922, at most 0.921, at most 0.920, or at most 0.919.

As described above, the glass of the present invention has a low transmittance in the visible range.

Optionally, the glass of the present invention at a thickness of 4 mm has an average transmittance for light of a wavelength in the range from 250 nm to 700 nm of at most 10%, optionally at most 5%, optionally at most 1%, optionally at most 0.1%. In order to determine this average transmittance, the transmittance is measured for any wavelength starting from 250 nm in increments of 1 nm until 700 nm. Thus, transmittance is measured at 250 nm, 251 nm, 252 nm, . . . , 698 nm, 699 nm and 700 nm. In total, the transmittance is determined at 451 different wavelengths from 250 nm to 700 nm. The average transmittance in the range of from 250 nm to 700 nm is then determined as the arithmetic mean value of the 451 transmittance values that have been measured.

The glass of the present invention at a thickness of 4 mm may for example have an average transmittance for light of a wavelength in the range of from 250 nm to 700 nm of at least $10^{-12}\%$, at least $10^{-10}\%$, at least $10^{-8}\%$. The glass of the present invention at a thickness of 4 mm may for example have an average transmittance for light of a wavelength in the range of from 250 nm to 700 nm in a range of from $10^{-12}\%$ to 10%, or from $10^{-12}\%$ to 5%, or from $10^{-12}\%$ to 1%, or from $10^{-12}\%$ to 0.1%.

On some optional embodiments, the glass of the present invention at a thickness of 2 mm has an average transmittance for light of a wavelength in the range of from 250 nm to 700 nm of at most 0.1%, optionally at most 0.01%, optionally at most 0.001%, optionally at most 0.0001%. In order to determine this average transmittance, the transmittance is measured for any wavelength starting from 250 nm in increments of 1 nm until 700 nm. Thus, transmittance is measured at 250 nm, 251 nm, 252 nm, . . . , 698 nm, 699 nm and 700 nm. In total, the transmittance is determined at 451 different wavelengths from 250 nm to 700 nm. The average transmittance in the range of from 250 nm to 700 nm is then determined as the mean value of the 451 transmittance values that have been measured. The glass of the present invention at a thickness of 2 mm may for example have an average transmittance for light of a wavelength in the range of from 250 nm to 700 nm of at least $10^{-12}\%$, or at least $10^{-10}\%$, or at least $10^{-8}\%$, or at least 0.00001%. The glass of the present invention at a thickness of 2 mm may for example have an average transmittance for light of a wavelength in the range of from 250 nm to 700 nm in a range of from $10^{-12}\%$ to 0.1%, or from $10^{-10}\%$ to 0.1, or from $10^{-8}\%$ to 0.1%, or from 0.00001% to 0.1%, from 0.00001% to 0.01%, from 0.00001% to 0.001%, or from 0.00001% to 0.0001%.

It is also optional that the maximum transmittance in the wavelength range of from 250 nm to 700 nm is comparably low. Optionally, the glass of the present invention at a thickness of 4 mm has a maximum transmittance for light of a wavelength in the range of from 250 nm to 700 nm of at most 15.0%, optionally at most 10.0%, optionally at most 1.0%, optionally at most 0.5%, optionally at most 0.2%, optionally at most 0.1%, optionally at most 0.01%. In order to determine the maximum transmittance, the transmittance is measured for any wavelength starting from 250 nm in increments of 1 nm until 700 nm. Thus, transmittance is measured at 250 nm, 251 nm, 252 nm, . . . , 698 nm, 699 nm and 700 nm. In total, the transmittance is determined at 451 different wavelengths from 250 nm to 700 nm. The maximum transmittance in the range of from 250 nm to 700 nm is then determined as the maximum value of the 451 transmittance values that have been measured. The glass of the present invention at a thickness of 4 mm may for example have a maximum transmittance for light of a wavelength in the range of from 250 nm to 700 nm of at least 0.0001%, or at least 0.001%. The glass of the present invention at a thickness of 4 mm may for example have a maximum transmittance for light of a wavelength in the range of from 250 nm to 700 nm in a range of from 0.0001% to 15.0%, from 0.0001% to 10.0%, from 0.0001% to 1.0%, from 0.0001% to 0.5%, from 0.001% to 0.2%, from 0.001% to 0.1%, or from 0.001% to 0.01%.

It is also optional that the maximum transmittance in the wavelength range of from 250 nm to 700 nm is comparably low. Optionally, the glass of the present invention at a thickness of 4 mm has a maximum transmittance for light of a wavelength in the range of from 250 nm to 700 nm of at most 15.0%, optionally at most 10.0%, more optionally at most 1.0%, optionally at most 0.5%, optionally at most 0.2%, optionally at most 0.1%, optionally at most 0.01%. In order to determine the maximum transmittance, the transmittance is measured for any wavelength starting from 250 nm in increments of 1 nm until 700 nm. Thus, transmittance is measured at 250 nm, 251 nm, 252 nm, . . . , 698 nm, 699 nm and 700 nm. In total, the transmittance is determined at 451 different wavelengths from 250 nm to 700 nm. The maximum transmittance in the range of from 250 nm to 700 nm is then determined as the maximum value of the 451 transmittance values that have been measured. The glass of the present invention at a thickness of 4 mm may for example have a maximum transmittance for light of a wavelength in the range of from 250 nm to 700 nm of at least 0.0001%, or at least 0.001%. The glass of the present invention at a thickness of 4 mm may for example have a maximum transmittance for light of a wavelength in the range of from 250 nm to 700 nm in a range of from 0.0001% to 5.0%, from 0.0001% to 2.0%, from 0.0001% to 1.0%, from 0.0001% to 0.5%, from 0.001% to 0.2%, from 0.001% to 0.1%, or from 0.001% to 0.01%.

The glasses of the present invention do not only have a low transmittance in the visible wavelength range but also a high transmittance in the NIR wavelength range. Particularly relevant is the transmittance in the ranges of from 1250 to 1350 nm, and/or from 1500 to 1600 nm.

Optionally, the glass of the present invention at a thickness of 2 mm has an average transmittance for light of a wavelength in the range of from 1250 nm to 1350 nm of at least 50%, optionally at least 55%, optionally at least 60%, optionally at least 65%, optionally at least 70%, optionally at least 75%, optionally at least 80%, optionally at least 85%. In order to determine this average transmittance, the transmittance is measured for any wavelength starting from 1250 nm in increments of 1 nm until 1350 nm. Thus, transmittance is measured at 1250 nm, 1251 nm, 1252 nm, . . . , 1348 nm, 1349 nm and 1350 nm. In total, the transmittance is determined at 101 different wavelengths from 1250 nm to 1350 nm. The average transmittance in the range of from 1250 nm to 1350 nm is then determined as the mean value of the 101 transmittance values that have been measured. The glass of the present invention at a thickness of 2 mm may for example have an average transmittance for light of a wavelength in the range of from 1250 nm to 1350 nm of at most 90%, or at most 88%. The glass of the present invention at a thickness of 2 mm may for example have an average transmittance for light of a wavelength in the range of from 1250 nm to 1350 nm in a range of from 50% to 90%, from 55% to 90%, from 60% to 90%, from 65% to 90%, from 70% to 88%, from 75% to 88%, from 80% to 88%, or from 85% to 88%.

It is also optional that the minimum transmittance in the wavelength range of from 1250 nm to 1350 nm is comparably high. Optionally, the glass of the present invention at a thickness of 2 mm has a minimum transmittance for light of a wavelength in the range of from 1250 nm to 1350 nm of at least 50%, optionally at least 55%, optionally at least 60%, optionally at least 65%, optionally at least 70%, optionally at least 75%, optionally at least 80%, optionally at least 85%. In order to determine the minimum transmittance, the transmittance is measured for any wavelength starting from 1250 nm in increments of 1 nm until 1350 nm. Thus, transmittance is measured at 1250 nm, 1251 nm, 1252 nm, . . . , 1348 nm, 1349 nm and 1350 nm. In total, the transmittance is determined at 101 different wavelengths from 1250 nm to 1350 nm. The minimum transmittance in the range of from 1250 nm to 1350 nm is then determined as the minimum value of the 101 transmittance values that have been measured. The glass of the present invention at a thickness of 2 mm may for example have a minimum transmittance for light of a wavelength in the range of from 1250 nm to 1350 nm of at most 90%, or at most 88%. The glass of the present invention at a thickness of 2 mm may for example have a minimum transmittance for light of a wavelength in the range of from 1250 nm to 1350 nm in a range of from 50% to 90%, from 55% to 90%, from 60% to 90%, from 65% to 90%, from 70% to 88%, from 75% to 88%, from 80% to 88%, or from 85% to 88%.

Optionally, the glass of the present invention at a thickness of 2 mm has an average transmittance for light of a wavelength in the range of from 1500 nm to 1600 nm of at least 50%, optionally at least 55%, optionally at least 60%, optionally at least 65%, optionally at least 70%, optionally at least 75%, optionally at least 80%, optionally at least 85%, optionally at least 87%, optionally at least 88%, optionally at least 89%, optionally at least 90%. In order to determine this average transmittance, the transmittance is measured for any wavelength starting from 1500 nm in increments of 1 nm until 1600 nm. Thus, transmittance is measured at 1500 nm, 1501 nm, 1502 nm, . . . , 1598 nm, 1599 nm and 1600 nm. In total, the transmittance is determined at 101 different wavelengths from 1500 nm to 1600 nm. The average transmittance in the range of from 1500 nm to 1600 nm is then determined as the mean value of the 101 transmittance values that have been measured. The glass of the present invention at a thickness of 2 mm may for example have an average transmittance for light of a wavelength in the range of from 1500 nm to 1600 nm of at most 92.5%, at most 92.0% or at most 91.5%. The glass of the present invention at a thickness of 2 mm may for example have an average transmittance for light of a wavelength in the range of from 1500 nm to 1600 nm in a range of from 50% to 92.5%, from 55% to 92.5%, from 60% to 92.5%, from 65% to 92.5%, from 70% to 92.0%, from 75% to 92.0%, from 80% to 92.0%, from 85% to 92.0%, from 87% to 91.5%, from 88% to 91.5%, from 89% to 91.5%, or from 90% to 91.5%.

It is also optional that the minimum transmittance in the wavelength range of from 1500 nm to 1600 nm is comparably high. Optionally, the glass of the present invention at a thickness of 2 mm has a minimum transmittance for light of a wavelength in the range of from 1500 nm to 1600 nm of at least 50%, optionally at least 55%, optionally at least 60%, optionally at least 65%, optionally at least 70%, optionally at least 75%, optionally at least 80%, optionally at least 85%, optionally at least 87%, optionally at least 88%, optionally at least 89%. In order to determine the minimum transmittance, the transmittance is measured for any wavelength starting from 1500 nm in increments of 1 nm until 1600 nm. Thus, transmittance is measured at 1500 nm, 1501 nm, 1502 nm, . . . , 1598 nm, 1599 nm and 1600 nm. In total, the transmittance is determined at 101 different wavelengths from 1500 nm to 1600 nm. The minimum transmittance in the range of from 1500 nm to 1600 nm is then determined as the minimum value of the 101 transmittance values that have been measured. The glass of the present invention at a thickness of 2 mm may for example have a minimum transmittance for light of a wavelength in the range of from 1500 nm to 1600 nm of at most 92.5%, at most 92.0%, at most 91.5% or at most 91%. The glass of the present invention at a thickness of 2 mm may for example have a minimum transmittance for light of a wavelength in the range of from 1500 nm to 1600 nm in a range of from 50% to 92.5%, from 55% to 92.5%, from 60% to 92.5%, from 65% to 92.0%, from 70% to 92.0%, from 75% to 92.0%, from 80% to 91.5%, from 85% to 91.5%, from 87% to 91.5%, from 88% to 91%, or from 89% to 91%.

As described above, the glass of the present invention has a low transmittance in the visible range.

In some embodiments, the glass of the present invention has a very low transmittance in the visible range, for example to avoid visual inspection of structures positioned behind the glass.

In some applications, wherein glasses having a higher thickness are advantageous regarding their higher mechanical stability, it may be beneficial to use a glass according to the invention including a comparatively low amount of coloring agents. Such glasses optionally have a very high transmittance in the NIR-range, even at a higher thickness. Such glasses also may have a higher transmittance in the visible range, than glasses including a higher amount of coloring agents. This—however—may be acceptable in applications, wherein the glass having a comparatively high thickness should have a very high transmittance in the NIR-range and/or for applications in long-range Lidar.

In some embodiments, it is optional that the glass of the present invention at a thickness of 4 mm has an average transmittance for light of a wavelength in the range of from 250 nm to 700 nm of at most $10^{-4}$%, optionally at most $10^{-5}$%, optionally at most $10^{-6}$%, optionally at most $10^{-7}$%. The glass of the present invention at a thickness of 4 mm may for example have an average transmittance for light of a wavelength in the range of from 250 nm to 700 nm of at least $10^{-12}$%, at least $10^{-11}$%, or at least $10^{-10}$%. The glass of the present invention at a thickness of 4 mm may for example have an average transmittance for light of a wavelength in the range of from 250 nm to 700 nm in a range of from $10^{-12}$% to $10^{-4}$%, from $10^{-12}$% to $10^{-5}$%, from $10^{-11}$% to $10^{-6}$%, or from $10^{-10}$% to $10^{-7}$%.

It is also optional that the maximum transmittance in the wavelength range of from 250 nm to 700 nm is comparably low. Optionally, the glass of the present invention at a thickness of 4 mm has a maximum transmittance for light of a wavelength in the range of from 250 nm to 700 nm of at most $10^{-2}$%, optionally at most $10^{-3}$%, optionally at most $10^{-4}$%, optionally at most $10^{-7}$%. The glass of the present invention at a thickness of 4 mm may for example have a maximum transmittance for light of a wavelength in the range of from 250 nm to 700 nm of at least $10^{-10}$%, at least $10^{-9}$%, or at least $10^{-8}$%. The glass of the present invention at a thickness of 4 mm may for example have a maximum transmittance for light of a wavelength in the range of from 250 nm to 700 nm in a range of from $10^{-10}$% to $10^{-2}$%, from $10^{-10}$% to $10^{-3}$%, from $10^{-9}$% to $10^{-4}$%, or from $10^{-8}$% to $10^{-7}$%.

The glasses of the present invention do not only have a low transmittance in the visible wavelength range but also a high transmittance in the NIR wavelength range. Particularly relevant is the transmittance in the ranges of from 1250 to 1350 nm, and/or from 1500 to 1600 nm.

Optionally, the glass of the present invention at a thickness of 4 mm has an average transmittance for light of a wavelength in the range of from 1250 nm to 1350 nm of at least 50%, optionally at least 55%, optionally at least 60%, optionally at least 65%, optionally at least 70%, optionally at least 75%, optionally at least 80%. The glass of the present invention at a thickness of 4 mm may for example have an average transmittance for light of a wavelength in the range of from 1250 nm to 1350 nm of at most 90%, at most 85%, at most 84% or at most 83%. The glass of the present invention at a thickness of 4 mm may for example have an average transmittance for light of a wavelength in the range of from 1250 nm to 1350 nm in a range of from 50% to 90%, from 55% to 90%, from 60% to 85%, from 65% to 85%, from 70% to 84%, from 75% to 84%, or from 80% to 83%.

It is also optional that the minimum transmittance in the wavelength range of from 1250 nm to 1350 nm is comparably high. Optionally, the glass of the present invention at a thickness of 4 mm has a minimum transmittance for light of a wavelength in the range of from 1250 nm to 1350 nm of at least 50%, more optionally at least 55%, optionally at least 60%, optionally at least 65%, optionally at least 70%, optionally at least 75%, optionally at least 76% at least 77%, at least 78%, or at least 79%. The glass of the present invention at a thickness of 4 mm may for example have a minimum transmittance for light of a wavelength in the range of from 1250 nm to 1350 nm of at most 90%, at most 85%, at most 82% or at most 81%. The glass of the present invention at a thickness of 4 mm may for example have a minimum transmittance for light of a wavelength in the range of from 1250 nm to 1350 nm in a range of from 50% to 90%, from 55% to 90%, from 60% to 90%, from 65% to 85%, from 70% to 85%, from 75% to 85%, from 76% to 82%, from 77% to 82%, from 78% to 81%, or from 79% to 81%.

Optionally, the glass of the present invention at a thickness of 4 mm has an average transmittance for light of a wavelength in the range of from 1500 nm to 1600 nm of at least 50%, optionally at least 55%, optionally at least 60%, optionally at least 65%, optionally at least 70%, optionally at least 75%, optionally at least 80%, optionally at least 85%, optionally at least 87%, optionally at least 88%. The glass of the present invention at a thickness of 4 mm may for example have an average transmittance for light of a wavelength in the range of from 1500 nm to 1600 nm of at most 91.0%, at most 90.5%, at most 90.0% or at most 89.5%. The glass of the present invention at a thickness of 4 mm may for example have an average transmittance for light of a wavelength in the range of from 1500 nm to 1600 nm in a range of from 50% to 91.0%, from 55% to 91.0%, from 60% to 90.5%, from 65% to 90.5%, from 70% to 90.5%, from 75% to 90.0%, from 80% to 90.0%, from 85% to 90.0%, from 87% to 89.5%, or from 88% to 89.5%.

It is also optional that the minimum transmittance in the wavelength range of from 1500 nm to 1600 nm is comparably high. Optionally, the glass of the present invention at a thickness of 4 mm has a minimum transmittance for light of a wavelength in the range of from 1500 nm to 1600 nm of at least 50%, optionally at least 55%, optionally at least 60%, optionally at least 65%, optionally at least 70%, optionally at least 75%, optionally at least 80% at least 82%, at least 84%, or at least 86%. The glass of the present invention at a thickness of 4 mm may for example have a minimum transmittance for light of a wavelength in the range of from 1500 nm to 1600 nm of at most 91%, at most 90%, at most 89% or at most 88%. The glass of the present invention at a thickness of 4 mm may for example have a minimum transmittance for light of a wavelength in the range of from 1500 nm to 1600 nm in a range of from 50% to 91%, from 55% to 91%, from 60% to 91%, from 65% to 90%, from 70% to 90%, from 75% to 90%, from 80% to 89%, from 82% to 89%, from 84% to 88%, or from 86% to 88%.

Optionally, the glasses of the present invention have an internal transmittance at a wavelength of 1550 nm of at least 94.0%, for example more than 94.0%, such as at least 94.5%, at least 95.0%, at least 95.5%, at least than 96.0%, at least 96.5%, at least 97.0%, at least 97.5%, or at least 98.0% at a sample thickness of 2 mm, more optionally at a sample thickness of 4 mm.

As described above, the glass of the present invention has a low internal transmittance in the visible range.

In some optional embodiments, the glass of the present invention at a thickness of 4 mm has an average internal transmittance for light of a wavelength in the range of from 250 nm to 700 nm of at most 10%, or at most 5%, or at most 3%, or at most 1%, optionally at most 0.1%, optionally at most 0.01%, optionally at most 0.001%. In order to determine this average internal transmittance, the transmittance is measured for any wavelength starting from 250 nm in increments of 1 nm until 700 nm. Thus, transmittance is measured at 250 nm, 251 nm, 252 nm, . . . , 698 nm, 699 nm and 700 nm. In total, the transmittance is determined at 451 different wavelengths from 250 nm to 700 nm. The internal transmittance is determined as ratio of the transmittance as measured and the $P_d$ value as described above. The average internal transmittance in the range of from 250 nm to 700 nm is then determined as the mean value of the 451 internal transmittance values that have been determined. The glass of the present invention at a thickness of 4 mm may for example have an average internal transmittance for light of a wavelength in the range of from 250 nm to 700 nm of at least $10^{-12}$%, or at least $10^{-10}$% or at least $10^{-8}$% or at least 0.00001%. The glass of the present invention at a thickness of 4 mm may for example have an average internal transmittance for light of a wavelength in the range of from 250 nm to 700 nm in a range of from $10^{-12}$% to 10%, or from $10^{-10}$% to 10%, or from $10^{-8}$% to 10%, or from 0.00001% to 10%, from 0.00001% to 1%, from 0.00001% to 0.1%, or from 0.00001% to 0.01%.

Optionally, the glass of the present invention at a thickness of 2 mm has an average internal transmittance for light of a wavelength in the range of from 250 nm to 700 nm of at most 0.1%, optionally at most 0.01%, optionally at most 0.001%, optionally at most 0.0001%. In order to determine this average internal transmittance, the transmittance is measured for any wavelength starting from 250 nm in increments of 1 nm until 700 nm. Thus, transmittance is measured at 250 nm, 251 nm, 252 nm, . . . , 698 nm, 699 nm and 700 nm. In total, the transmittance is determined at 451 different wavelengths from 250 nm to 700 nm. The internal transmittance is determined as ratio of the transmittance as measured and the $P_d$ value as described above. The average internal transmittance in the range of from 250 nm to 700 nm is then determined as the mean value of the 451 internal transmittance values that have been determined. The glass of the present invention at a thickness of 2 mm may for example have an average internal transmittance for light of a wavelength in the range of from 250 nm to 700 nm of at least 0.00001%. The glass of the present invention at a thickness of 2 mm may for example have an average internal transmittance for light of a wavelength in the range of from 250 nm to 700 nm in a range of from 0.00001% to 0.1%, from 0.00001% to 0.01%, from 0.00001% to 0.001%, or from 0.00001% to 0.0001%.

It is also optional that the maximum internal transmittance in the wavelength range of from 250 nm to 700 nm is comparably low.

In some optional embodiments, the glass of the present invention at a thickness of 4 mm has a maximum internal transmittance for light of a wavelength in the range of from 250 nm to 700 nm of at most 15.0%, optionally at most 10.0%, more optionally at most 5.0%, optionally at most 2%, optionally at most 1.5%, optionally at most 1%, optionally at most 0.5%. In order to determine the maximum internal transmittance, the transmittance is measured for any wavelength starting from 250 nm in increments of 1 nm until 700 nm. Thus, transmittance is measured at 250 nm, 251 nm, 252 nm, . . . , 698 nm, 699 nm and 700 nm. In total, the transmittance is determined at 451 different wavelengths from 250 nm to 700 nm. The internal transmittance is determined as ratio of the transmittance as measured and the $P_d$ value as described above. The maximum internal transmittance in the range of from 250 nm to 700 nm is then determined as the maximum value of the 451 internal transmittance values that have been determined. The glass of the present invention at a thickness of 4 mm may for example have a maximum internal transmittance for light of a wavelength in the range of from 250 nm to 700 nm of at least $10^{-12}$%, or at least $10^{-10}$%, or at least $10^{-8}$%, or at least $10^{-6}$%, or at least 0.0001%, or at least 0.001% or at least 0.01. The glass of the present invention at a thickness of 4 mm may for example have a maximum internal transmittance for light of a wavelength in the range of from 250 nm to 700 in a range of from $10^{-12}$% to 15%, from $10^{-10}$ % to 10%, from $10^{-8}$% to 5%, from $10^{-6}$% to 2%, from 0.0001% to 1.5%, from 0.001% to 1%, from 0.01% to 1.0%, from 0.0001% to 0.5%, from 0.001% to 1%, from 0.001% to 0.5%, or from 0.001% to 0.1%.

Optionally, the glass of the present invention at a thickness of 2 mm has a maximum internal transmittance for light of a wavelength in the range of from 250 nm to 700 nm of at most 5.0%, optionally at most 2.0%, optionally at most 1.0%, optionally at most 0.5%, optionally at most 0.2%, optionally at most 0.1%, optionally at most 0.01%. In order to determine the maximum internal transmittance, the transmittance is measured for any wavelength starting from 250 nm in increments of 1 nm until 700 nm. Thus, transmittance is measured at 250 nm, 251 nm, 252 nm, . . . , 698 nm, 699 nm and 700 nm. In total, the transmittance is determined at 451 different wavelengths from 250 nm to 700 nm. The internal transmittance is determined as ratio of the transmittance as measured and the $P_d$ value as described above. The maximum internal transmittance in the range of from 250 nm to 700 nm is then determined as the maximum value of the 451 internal transmittance values that have been determined. The glass of the present invention at a thickness of 2 mm may for example have a maximum internal transmittance for light of a wavelength in the range of from 250 nm to 700 nm of at least 0.0001%, or at least 0.001%. The glass of the present invention at a thickness of 2 mm may for example have a maximum internal transmittance for light of a wavelength in the range of from 250 nm to 700 in a range of from 0.0001% to 5.0%, from 0.0001% to 2.0%, from 0.0001% to 1.0%, from 0.0001% to 0.5%, from 0.001% to 0.2%, from 0.001% to 0.1%, or from 0.001% to 0.01%.

The glasses of the present invention do not only have a low internal transmittance in the visible wavelength range but also a high internal transmittance in the NIR wavelength range. Particularly relevant is the transmittance in the ranges of from 1250 to 1350 nm, and/or from 1500 to 1600 nm.

Optionally, the glass of the present invention at a thickness of 2 mm has an average internal transmittance for light of a wavelength in the range of from 1250 nm to 1350 nm of at least 50%, optionally at least 55%, optionally at least 60%, optionally at least 65%, optionally at least 70%, optionally at least 75%, optionally at least 80%, optionally at least 85%, optionally at least 88%, optionally at least 90%, optionally at least 91%, optionally at least 92%, optionally at least 93%, optionally at least 94%. In order to determine this average internal transmittance, the transmittance is measured for any wavelength starting from 1250 nm in increments of 1 nm until 1350 nm. Thus, transmittance is measured at 1250 nm, 1251 nm, 1252 nm, . . . , 1348 nm, 1349 nm and 1350 nm. In total, the transmittance is determined at 101 different wavelengths from 1250 nm to 1350 nm. The internal transmittance is determined as ratio of the transmittance as measured and the $P_d$ value as described above. The average internal transmittance in the range of from 1250 nm to 1350 nm is then determined as the mean value of the 101 internal transmittance values that have been determined. The glass of the present invention at a thickness of 2 mm may for example have an average internal transmittance for light of a wavelength in the range of from 1250 nm to 1350 nm of at most 97%, at most 96%, or at most 95%. The glass of the present invention at a thickness of 2 mm may for example have an average internal transmittance for light of a wavelength in the range of from 1250 nm to 1350 nm in a range of from 50% to 97%, from 55% to 97%, from 60% to 97%, from 65% to 97%, from 70% to 97%, from 75% to 96%, from 80% to 96%, from 85% to 96%, from 88% to 96%, from 90% to 96%, from 91% to 95%, from 92% to 95%, from 93% to 95%, or from 94% to 95%.

It is also optional that the minimum internal transmittance in the wavelength range of from 1250 nm to 1350 nm is comparably high. Optionally, the glass of the present invention at a thickness of 2 mm has a minimum internal transmittance for light of a wavelength in the range of from 1250 nm to 1350 nm of at least 50%, optionally at least 55%, optionally at least 60%, optionally at least 65%, optionally at least 70%, optionally at least 75%, optionally at least 80%, optionally at least 85%, optionally at least 88%, optionally at least 90%, optionally at least 91%, optionally at least 92%, optionally at least 93%. In order to determine the minimum internal transmittance, the transmittance is measured for any wavelength starting from 1250 nm in increments of 1 nm until 1350 nm. Thus, transmittance is measured at 1250 nm, 1251 nm, 1252 nm, . . . , 1348 nm, 1349 nm and 1350 nm. In total, the transmittance is determined at 101 different wavelengths from 1250 nm to 1350 nm. The internal transmittance is determined as ratio of the transmittance as measured and the $P_d$ value as described above. The minimum internal transmittance in the range of from 1250 nm to 1350 nm is then determined as the minimum value of the 101 internal transmittance values that have been determined. The glass of the present invention at a thickness of 2 mm may for example have a minimum internal transmittance for light of a wavelength in the range of from 1250 nm to 1350 nm of at most 97%, at most 96%, at most 95%, or at most 94%. The glass of the present invention at a thickness of 2 mm may for example have a minimum internal transmittance for light of a wavelength in the range of from 1250 nm to 1350 nm in a range of from 50% to 97%, from 55% to 97%, from 60% to 97%, from 65% to 97%, from 70% to 96%, from 75% to 96%, from 80% to 96%, from 85% to 95%, from 88% to 95%, from 90% to 95%, from 91% to 94%, from 92% to 94%, or from 93% to 94%.

Optionally, the glass of the present invention at a thickness of 2 mm has an average internal transmittance for light of a wavelength in the range of from 1500 nm to 1600 nm of at least 50%, optionally at least 55%, optionally at least 60%, optionally at least 65%, optionally at least 70%, optionally at least 75%, optionally at least 80%, optionally at least 85%, optionally at least 88%, optionally at least 90%, optionally at least 91%, optionally at least 92%, optionally at least 93%, optionally at least 94%, optionally at least 95%, optionally at least 96%, optionally at least 97%, optionally at least 98%. In order to determine this average internal transmittance, the transmittance is measured for any wavelength starting from 1500 nm in increments of 1 nm until 1600 nm. Thus, transmittance is measured at 1500 nm, 1501 nm, 1502 nm, . . . , 1598 nm, 1599 nm and 1600 nm. In total, the transmittance is determined at 101 different wavelengths from 1500 nm to 1600 nm. The internal transmittance is determined as ratio of the transmittance as measured and the $P_d$ value as described above. The average internal transmittance in the range of from 1500 nm to 1600 nm is then determined as the mean value of the 101 internal transmittance values that have been determined. The glass of the present invention at a thickness of 2 mm may for example have an average internal transmittance for light of a wavelength in the range of from 1500 nm to 1600 nm of at most 99.5%, at most 99.0%, or at most 98.5%. The glass of the present invention at a thickness of 2 mm may for example have an average internal transmittance for light of a wavelength in the range of from 1500 nm to 1600 nm in a range of from 50% to 99.5%, from 55% to 99.5%, from 60% to 99.5%, from 65% to 99.5%, from 70% to 99.5%, from 75% to 99.5%, from 80% to 99.0%, from 85% to 99.0%, from 88% to 99.0%, from 90% to 99.0%, from 91% to 99.0%, from 92% to 99.0%, from 93% to 99.0%, from 94% to 98.5%, from 95% to 98.5%, from 96% to 98.5%, from 97% to 98.5%, or from 98% to 98.5%.

It is also optional that the minimum internal transmittance in the wavelength range of from 1500 nm to 1600 nm is comparably high. Optionally, the glass of the present invention at a thickness of 2 mm has a minimum internal transmittance for light of a wavelength in the range of from 1500 nm to 1600 nm of at least 50%, optionally at least 55%, optionally at least 60%, optionally at least 65%, optionally at least 70%, optionally at least 75%, optionally at least 80%, optionally at least 85%, optionally at least 88%, optionally at least 90%, optionally at least 91%, optionally at least 92%, optionally at least 93%, optionally at least 94%, optionally at least 95%, optionally at least 96%, optionally at least 97%. In order to determine the minimum internal transmittance, the transmittance is measured for any wavelength starting from 1500 nm in increments of 1 nm until 1600 nm. Thus, transmittance is measured at 1500 nm, 1501 nm, 1502 nm, . . . , 1598 nm, 1599 nm and 1600 nm. In total, the transmittance is determined at 101 different wavelengths from 1500 nm to 1600 nm. The internal transmittance is determined as ratio of the transmittance as measured and the $P_d$ value as described above. The minimum internal transmittance in the range of from 1500 nm to 1600 nm is then determined as the minimum value of the 101 internal transmittance values that have been determined. The glass of the present invention at a thickness of 2 mm may for example have a minimum internal transmittance for light of a wavelength in the range of from 1500 nm to 1600 nm of at most 99.5%, at most 99.0%, at most 98.5%, or at most 98.0%. The glass of the present invention at a thickness of 2 mm may for example have a minimum internal transmittance for light of a wavelength in the range of from 1500 nm to 1600 nm in a range of from 50% to 99.5%, from 55% to 99.5%, from 60% to 99.5%, from 65% to 99.5%, from 70% to 99.5%, from 75% to 99.0%, from 80% to 99.0%, from 85% to 99.0%, from 88% to 99.0%, from 90% to 98.5%, from 91% to 98.5%, from 92% to 98.5%, from 93% to 98.5%, from 94% to 98.0%, from 95% to 98.0%, from 96% to 98.0%, or from 97% to 98.0%.

As described above, the glass of the present invention has a low internal transmittance in the visible range.

Optionally, the glass of the present invention at a thickness of 4 mm has an average internal transmittance for light of a wavelength in the range of from 250 nm to 700 nm of at most 4%, optionally at most $10^{-4}$%, optionally at most $10^{-5}$%, optionally at most $10^{-6}$%, optionally at most $10^{-7}$%. The glass of the present invention at a thickness of 4 mm may for example have an average internal transmittance for light of a wavelength in the range of from 250 nm to 700 nm of at least $10^{-12}$%, at least $10^{-11}$%, or at least $10^{-10}$%. The glass of the present invention at a thickness of 4 mm may for example have an average internal transmittance for light of a wavelength in the range of from 250 nm to 700 nm in a range of from $10^{-12}$% to $10^{-4}$%, from $10^{-12}$% to $10^{-5}$%, from $10^{-11}$% to $10^{-6}$%, or from $10^{-10}$% to $10^{-7}$%.

It is also optional that the maximum internal transmittance in the wavelength range of from 250 nm to 700 nm is comparably low. Optionally, the glass of the present invention at a thickness of 4 mm has a maximum internal transmittance for light of a wavelength in the range of from 250 nm to 700 nm of at most $10^{-2}$%, optionally at most $10^{-3}$%, optionally at most $10^{-4}$%, optionally at most $10^{-7}$%. The glass of the present invention at a thickness of 4 mm may for example have a maximum internal transmittance for light of a wavelength in the range of from 250 nm to 700 nm of at least $10^{-10}$%, at least $10^{-9}$%, or at least $10^{-8}$%. The glass of the present invention at a thickness of 4 mm may for example have a maximum internal transmittance for light of a wavelength in the range of from 250 nm to 700 nm in a range of from $10^{-10}$% to $10^{-2}$%, from $10^{-10}$% to $10^{-3}$%, from $10^{-9}$% to $10^{-4}$%, or from $10^{-8}$% to $10^{-7}$%.

The glasses of the present invention do not only have a low internal transmittance in the visible wavelength range but also a high internal transmittance in the NIR wavelength range. Particularly relevant is the internal transmittance in the ranges of from 1250 to 1350 nm, and/or from 1500 to 1600 nm.

Optionally, the glass of the present invention at a thickness of 4 mm has an average internal transmittance for light of a wavelength in the range of from 1250 nm to 1350 nm of at least 50%, optionally at least 55%, optionally at least 60%, optionally at least 65%, optionally at least 70%, optionally at least 75%, optionally at least 80%, optionally at least 85%, optionally at least 86%, optionally at least 87%, optionally at least 88%. The glass of the present invention at a thickness of 4 mm may for example have an average internal transmittance for light of a wavelength in the range of from 1250 nm to 1350 nm of at most 98%, at most 95%, at most 92%, or at most 90%. The glass of the present invention at a thickness of 4 mm may for example have an average internal transmittance for light of a wavelength in the range of from 1250 nm to 1350 nm in a range of from 50% to 98%, from 55% to 98%, from 60% to 98%, from 65% to 95%, from 70% to 95%, from 75% to 95%, from 80% to 92%, from 85% to 92%, from 86% to 92%, from 87% to 90%, or from 88% to 90%.

It is also optional that the minimum internal transmittance in the wavelength range of from 1250 nm to 1350 nm is comparably high. Optionally, the glass of the present invention at a thickness of 4 mm has a minimum internal transmittance for light of a wavelength in the range of from 1250 nm to 1350 nm of at least 50%, more optionally at least 55%, optionally at least 60%, optionally at least 65%, optionally at least 70%, optionally at least 75%, optionally at least 80%, optionally at least 82%, optionally at least 85%, optionally at least 86%. The glass of the present invention at a thickness of 4 mm may for example have a minimum internal transmittance for light of a wavelength in the range of from 1250 nm to 1350 nm of at most 98%, at most 95%, at most 92%, at most 90%, or at most 88%. The glass of the present invention at a thickness of 4 mm may for example have a minimum internal transmittance for light of a wavelength in the range of from 1250 nm to 1350 nm in a range of from 50% to 98%, from 55% to 98%, from 60% to 95%, from 65% to 95%, from 70% to 92%, from 75% to 92%, from 80% to 90%, from 82% to 90%, from 85% to 88%, or from 86% to 88%.

Optionally, the glass of the present invention at a thickness of 4 mm has an average internal transmittance for light of a wavelength in the range of from 1500 nm to 1600 nm of at least 50%, optionally at least 55%, optionally at least 60%, optionally at least 65%, more optionally at least 70%, more optionally at least 75%, optionally at least 80%, optionally at least 85%, optionally at least 90%, optionally at least 92%, optionally at least 95%. The glass of the present invention at a thickness of 4 mm may for example have an average internal transmittance for light of a wavelength in the range of from 1500 nm to 1600 nm of at most 99%, at most 98%, at most 97%, or at most 96%. The glass of the present invention at a thickness of 4 mm may for example have an average internal transmittance for light of a wavelength in the range of from 1500 nm to 1600 nm in a range of from 50% to 99%, from 55% to 99%, from 60% to 99%, from 65% to 98%, from 70% to 98%, from 75% to 98%, from 80% to 97%, from 85% to 97%, from 90% to 97%, from 92% to 96%, or from 95% to 96%.

It is also optional that the minimum internal transmittance in the wavelength range of from 1500 nm to 1600 nm is comparably high. Optionally, the glass of the present invention at a thickness of 4 mm has a minimum internal transmittance for light of a wavelength in the range of from 1500 nm to 1600 nm of at least 50%, optionally at least 55%, optionally at least 60%, optionally at least 65%, optionally at least 70%, optionally at least 75%, optionally at least 80%, optionally at least 85%, optionally at least 90%, optionally at least 92%, optionally at least 94%. The glass of the present invention at a thickness of 4 mm may for example have a minimum internal transmittance for light of a wavelength in the range of from 1500 nm to 1600 nm of at most 99%, at most 98%, at most 97%, at most 96%, or at most 95%. The glass of the present invention at a thickness of 4 mm may for example have a minimum internal transmittance for light of a wavelength in the range of from 1500 nm to 1600 nm in a range of from 50% to 99%, from 55% to 99%, from 60% to 99%, from 65% to 98%, from 70% to 98%, from 75% to 97%, from 80% to 97%, from 85% to 96%, from 90% to 96%, from 92% to 95%, or from 94% to 95%.

The present invention also relates to glass articles including, optionally consisting of the glass of the present invention. Optionally, the glass article is a bandpass filter. Optionally, the glass article is an optical component such as for example an optical window, in particular for a LiDAR system. Optionally, the glass article has a thickness in a range of from 1.0 to 7.0 mm, optionally from 2.0 to 6.0 mm, optionally from 3.0 to 5.0 mm, for example from 3.5 to 4.5 mm or about 4.0 mm. The thickness may for example be at least 1.0 mm, at least 2.0 mm, at least 3.0 mm, at least 3.5 mm, or at least 4.0 mm. The thickness may for example be at most 7.0 mm, at most 6.0 mm, at most 5.0 mm, at most 4.5 mm, or at most 4.0 mm.

The glass articles of the present invention may have a particularly small number of bubbles. The bubble content can be characterized by the overall cross-sectional area of the bubbles in $mm^2$ relative to 100 $cm^3$ of glass volume, calculated from the sum of the cross-sectional areas of the individual bubbles detected, in particular according to ISO 12123:2018. Inclusions in the glass, such as small stones or crystals, are treated as bubbles in the same cross-sectional area. Only bubbles and inclusions that are larger than 0.03 mm in diameter are included in the assessment. In the glass articles of the invention, the total cross-section of all bubbles/inclusions ≥0.03 mm in diameter may for example be at most 0.5 $mm^2$, optionally at most 0.4 $mm^2$, optionally at most 0.25 $mm^2$ per 100 $cm^3$ of glass volume, in particular at most 0.20 $mm^2$ per 100 $cm^3$ of glass volume, at most 0.15 $mm^2$ per 100 $cm^3$ of glass volume, at most 0.10 $mm^2$ per 100 $cm^3$ of glass volume, at most 0.05 $mm^2$ per 100 $cm^3$ of glass volume, or at most 0.03 $mm^2$ per 100 $cm^3$ of glass volume. The total cross-section of all bubbles/inclusions ≥0.03 mm in diameter may for example be at least 0.001 $mm^2$ per 100 $cm^3$ of glass volume, at least 0.005 $mm^2$ per 100 $cm^3$ of glass volume, or at least 0.01 $mm^2$ per 100 $cm^3$ of glass volume. The total cross-section of all bubbles/inclusions ≥0.03 mm in diameter may for example be in a range of from 0.001 to 0.5 $mm^2$ per 100 $cm^3$ of glass volume, from 0.001 to 0.4 $mm^2$ per 100 $cm^3$ of glass volume, from 0.001 to 0.25 $mm^2$ per 100 $cm^3$ of glass volume, from 0.001 to 0.20 $mm^2$ per 100 $cm^3$ of glass volume, from 0.005 to 0.15 $mm^2$ per 100 $cm^3$ of glass volume, from 0.005 to 0.10 $mm^2$ per 100 $cm^3$ of glass volume, from 0.01 to 0.05 $mm^2$ per 100 $cm^3$ of glass volume, or from 0.01 to 0.03 $mm^2$ per 100 $cm^3$ of glass volume.

Optionally, the glass and/or glass article of the present invention has a hydrolytic resistance according to class 1 of DIN ISO 719:2020-09. Optionally, the glass and/or glass article of the invention has a hydrolytic resistance according to class 1 of DIN ISO 720:1989-12. Optionally, the glass and/or glass article of the invention has an alkaline resistance according to class 2, optionally according to class 1 of DIN ISO 695:1994-02. Optionally, the glass and/or glass article of the invention has an acid resistance according to class 1 of DIN 12116:2001-03. Optionally, the glass and/or glass article of the invention has a hydrolytic resistance according to class 1 of DIN ISO 719:2020-09, a hydrolytic resistance according to class 1 of DIN ISO 720:1989-12, an alkaline resistance according to class 2, optionally according to class 1 of DIN ISO 695:1994-02, and/or an acid resistance according to class 1 of DIN 12116:2001-03.

Optionally, the glass and/or glass article of the present invention has a hydrolytic resistance according to class 1 of DIN ISO 719:2020-09 and according to class 1 of DIN ISO 720:1989-12. Optionally, the glass of the invention has an alkaline resistance according to class 2, optionally according to class 1 of DIN ISO 695:1994-02 and an acid resistance according to class 1 of DIN 12116:2001-03.

Optionally, the glass and/or glass article of the invention has a hydrolytic resistance according to class 1 of DIN ISO 719:2020-09, and an alkaline resistance according to class 2, optionally according to class 1 of DIN ISO 695:1994-02. Optionally, the glass and/or glass article of the invention has a hydrolytic resistance according to class 1 of DIN ISO 719:2020-09, and an acid resistance according to class 1 of DIN 12116:2001-03. Optionally, the glass and/or glass article of the invention has a hydrolytic resistance according to class 1 of DIN ISO 719:2020-09, an alkaline resistance according to class 2, optionally according to class 1 of DIN ISO 695:1994-02, and an acid resistance according to class 1 of DIN 12116:2001-03.

Optionally, the glass and/or glass article of the present invention has a hydrolytic resistance according to class 1 of DIN ISO 720:1989-12, and an alkaline resistance according to class 2, more optionally according to class 1 of DIN ISO 695:1994-02. Optionally, the glass and/or glass article of the invention has a hydrolytic resistance according to class 1 of DIN ISO 720:1989-12, and an acid resistance according to class 1 of DIN 12116:2001-03. Optionally, the glass and/or glass article of the invention has a hydrolytic resistance according to class 1 of DIN ISO 720:1989-12, an alkaline resistance according to class 2, optionally according to class 1 of DIN ISO 695:1994-02, and an acid resistance according to class 1 of DIN 12116:2001-03.

Optionally, the glass and/or glass article of the present invention has a hydrolytic resistance according to class 1 of DIN ISO 719:2020-09, a hydrolytic resistance according to class 1 of DIN ISO 720:1989-12, and an alkaline resistance according to class 2, optionally according to class 1 of DIN ISO 695:1994-02. Optionally, the glass and/or glass article of the invention has a hydrolytic resistance according to class 1 of DIN ISO 719:2020-09, a hydrolytic resistance according to class 1 of DIN ISO 720:1989-12, and an acid resistance according to class 1 of DIN 12116:2001-03. Optionally, the glass and/or glass article of the invention has a hydrolytic resistance according to class 1 of DIN ISO 719:2020-09, a hydrolytic resistance according to class 1 of DIN ISO 720:1989-12, an alkaline resistance according to class 2, optionally according to class 1 of DIN ISO 695:1994-02, and an acid resistance according to class 1 of DIN 12116:2001-03.

Optionally, the glass article of the present invention has a high mechanical resistance. The glass article may pass the stone impact test according to method A of DIN EN ISO 20567-1:2017-07 at a reference thickness of 3.8 mm, in particular without breakage. For example, the glass article may achieve a characteristic value of at most 5.0, at most 4.5, at most 4.0, at most 3.5, at most 3.0, at most 2.5, or at most 2.0 in the stone impact test according to method A of DIN EN ISO 20567-1:2017-07 at a reference thickness of 3.8 mm. The characteristic value in the stone impact test according to DIN EN ISO 20567-1:2017-07 is determined based on the damaged area of the sample. The larger the damaged area is, the higher is the characteristic value. The glass article of the invention may have a characteristic value of at least 0.5, at least 1.0, or at least 1.5 in the stone impact test according to method A of DIN EN ISO 20567-1:2017-07 at a reference thickness of 3.8 mm. The glass article of the invention may have a characteristic value in a range of from 0.5 to 5.0, from 0.5 to 4.5, from 1.0 to 4.0, from 1.0 to 3.5, from 1.0 to 3.0, from 1.5 to 2.5, or from 1.5 to 2.0 in the stone impact test according to method A of DIN EN ISO 20567-1:2017-07 at a reference thickness of 3.8 mm. The term "method A" refers to the test pressure being 1.0±0.1 bar. In contrast, the test pressure in "method B" of DIN EN ISO 20567-1:2017-07 is 2.0±0.1 bar.

The net sample size for the stone impact test may for example be 80×80 mm². Net sample size indicates the area of the sample that is subjected to the stone impact. The sample is generally larger than the net sample size because it is inserted into a frame that protects a part of the sample from the stone impact. For example, if a sample has a size of 100×100 mm² and is inserted into a frame having a frame width of 10 mm, the resulting net sample size is 80×80 mm².

The characteristic value in the stone impact test according to method A of DIN EN ISO 20567-1:2017-07 may also be expressed normalized to the thickness of the glass article. For example, the glass article may have a characteristic value of at most 1.30 per mm thickness of the glass article, at most 1.15 per mm thickness of the glass article, at most 1.00 per mm thickness of the glass article, at most 0.85 per mm thickness of the glass article, at most 0.70 per mm thickness of the glass article, or at most 0.55 per mm thickness of the glass article in the stone impact test according to method A of DIN EN ISO 20567-1:2017-07. The glass article of the present invention may have a characteristic value of at least 0.10 per mm thickness of the glass article, at least 0.25 per mm thickness of the glass article, or at least 0.35 per mm thickness of the glass article in the stone impact test according to method A of DIN EN ISO 20567-1:2017-07. The glass article of the invention may have a characteristic value in a range of from 0.10 to 1.30 per mm thickness of the glass article, from 0.10 to 1.15 per mm thickness of the glass article, from 0.25 to 1.00 per mm thickness of the glass article, from 0.25 to 0.85 per mm thickness of the glass article, from 0.35 to 0.70 per mm thickness of the glass article, or from 0.35 to 0.55 per mm thickness of the glass article in the stone impact test according to method A of DIN EN ISO 20567-1:2017-07.

Optional conditions and settings of the stone impact test are summarized in the following table.

| | |
|---|---|
| Funding time/Gravel feed per cycle: | 10 sec. ± 2 sec. |
| Grit/Blasting material: | Chilled iron grit as per DIN EN ISO 11124-2 |
| Mass of grit: | 2 × 500 g (0 + 20) |
| Number of cycles: | 2 |
| Grit/Blasting matertial size: | 3.55-5.00 mm according to DIN EN ISO 11125-2 and DIN EN ISO 565 |
| Manufacturer of gravel/grit: | Eisenwerk Würth |
| Test pressure: | Method A: 1.0 ± 0.1 bar<br>Method B: 2.0 ± 0.1 bar |
| Impact angle: | 54° |
| Temperature: | 22° C. ± 1° C. |
| Humidity: | 44% ± 2% |
| Adhesive tape: | Tesa 4657 |
| Pre-conditioning: | for min. 24 h at 23° C. and 50% RH |
| Distance betwen granule acceleration tube and sample center: | 290 ± 1 mm |

All loose particles generated by the stone impact test may be removed with adhesive tape and the total loss of weight may be determined as the total weight of all particles removed with the adhesive tape. A low total loss of weight shows that the glass article has an excellent impact resistance. The glass article of the present invention may for example have a total loss of weight of at most 500 mg, at most 250 mg, at most 200 mg, at most 150 mg, at most 100 mg, or at most 75 mg in the stone impact test according to method A of DIN EN ISO 20567-1:2017-07 at a reference thickness of 3.8 mm. The glass article of the invention may for example have a total loss of weight of at least 5 mg, at least 10 mg, at least 15 mg, at least 25 mg, at least 35 mg, or at least 50 mg in the stone impact test according to method A of DIN EN ISO 20567-1:2017-07 at a reference thickness of 3.8 mm. The glass article of the invention may for example have a total loss of weight in a range of from 5 to 500 mg, from 10 to 250 mg, from 15 to 200 mg, from 25 to 150 mg, from 35 to 100 mg, or from 50 to 75 mg in the stone impact test according to method A of DIN EN ISO 20567-1:2017-07 at a reference thickness of 3.8 mm.

The total weight loss may also be expressed normalized to the thickness of the glass article. The glass article of the present invention may for example have a total loss of weight of at most 150 mg per mm thickness of the glass article, at most 75 mg per mm thickness of the glass article, at most 60 mg per mm thickness of the glass article, at most 40 mg per mm thickness of the glass article, at most 30 mg per mm thickness of the glass article, or at most 20 mg per mm thickness of the glass article in the stone impact test according to method A of DIN EN ISO 20567-1:2017-07. The glass article of the invention may for example have a total loss of weight of at least 1.0 mg per mm thickness of the glass article, at least 2.5 mg per mm thickness of the glass article, at least 3.5 mg per mm thickness of the glass article, at least 6.5 mg per mm thickness of the glass article, at least 9.0 mg per mm thickness of the glass article, or at least 12.5 mg per mm thickness of the glass article in the stone impact test according to method A of DIN EN ISO 20567-1:2017-07. The glass article of the invention may for example have a total loss of weight in a range of from 1.0 to 150 mg per mm thickness of the glass article, from 2.5 to 75 mg per mm thickness of the glass article, from 3.5 to 60 mg per mm thickness of the glass article, from 6.5 to 40 mg per mm thickness of the glass article, from 9.0 to 30 mg per mm thickness of the glass article, or from 12.5 to 20 mg per mm thickness of the glass article in the stone impact test according to method A of DIN EN ISO 20567-1:2017-07.

Glass articles according to the present invention are suitable for the use in LiDAR and/or automotive applications and therefore often are exposed to sun light for years. As a consequence, the optical properties of the glass article may be disadvantageously influenced by solarization effects in the glass, i.e. an absorption-induced generation of defect centers in the glass article, which may result in a reduction of the transmission at the application wavelength. In some optional embodiments of the invention, that the glass article a high solarization resistance, in other words, the transmission of the glass article for light having a specific wavelength, especially in the range from 700 nm to 1700 nm, from 900 nm to 1600 nm, from 1250 nm to 1600 nm; at 1320 nm or/at 1550 nm does not significantly decrease after the irradiation to light. For evaluating materials with respect to their solarization resistance, a test with a Hg high pressure lamp (HOK 4) has shown to be advantageous. According to the present invention, the sample of a sample thickness d of 4 mm after irradiation with a HOK 4 lamp for 15 hours. On the other hand, the not-induced Transmittance $T(\lambda)_{initial}$ describes the transmittance at a wavelength $\lambda$, of a sample with a sample thickness d of 4 mm prior to irradiation.

In some embodiments, a HOK 4/120 lamp from Philips is used. The spectrum of this HOK 4/120 lamp is shown in FIG. 3. In some embodiments, the distance between the lamp and the sample is 7 cm. In some embodiments, the power density is 25 mW/cm². In some embodiments, the sample has a diameter of 18 mm and a thickness of 4 mm. Here, the dimension of 4 mm, such as already described previously, is referred to as sample thickness d.

Optionally, the glass article according to an invention fulfills at least one of the following conditions i) $\Delta T_{Sol}$ (905 nm)=T(905 nm)$|_{initial}$− T(905 nm)$|_{irradiated}$, wherein $\Delta T_{Sol}$ is less than 5%, optionally less than 4%, optionally less than 3%, optionally less than 2%;

ii) $\Delta T_{Sol}$(1320 nm)=T(1320 nm)$|_{initial}$−T(1320 nm)$|_{irradiated}$, wherein $\Delta T_{Sol}$ is less than 5%, optionally less than 4%, optionally less than 3%, optionally less than 2%;

iii) $\Delta T_{Sol}$(1550 nm)=T(1550 nm)$|_{initial}$−T(1550 nm)$|_{irradiated}$ wherein $\Delta T_{Sol}$ is less than 5%, optionally less than 4%, optionally less than 3%, optionally less than 2%;

wherein $T(\lambda)_{initial}$ is the transmission at a wavelength $\lambda$ of a sample having a sample thickness of 4 mm prior to irradiation, $T(\lambda)_{irradiated}$ is the transmission at a wavelength $\lambda$ of a sample having a sample thickness of 4 mm after an irradiation of 15 hours with a HOK 4 lamp, and $\Delta T_{Sol}$ is the difference between $T(\lambda)_{initial}$ and $T(\lambda)_{irradiated}$.

Optionally, at least one of the following conditions is fulfilled; optionally both conditions are fulfilled:

ii) $\Delta T_{Sol}$(1320 nm)=T(1320 nm)$|_{initial}$−T(1320 nm)$|_{irradiated}$ wherein $\Delta T_{Sol}$ is less than 5%, optionally less than 4%, optionally less than 3%, optionally less than 2%;

iii) $\Delta T_{Sol}$(1550 nm)=T(1550 nm)$|_{initial}$−T(1550 nm)$|_{irradiated}$ wherein $\Delta T_{Sol}$ is less than 5%, optionally less than 4%, optionally less than 3%, optionally less than 2%.

The present invention also relates to the use of the glass or glass article of the invention in a LiDAR system.

The present invention also relates to a LiDAR system including a laser and an optical window positioned between the laser and the surrounding, wherein the optical window includes the glass or glass article of the invention.

The present invention also relates to a method for producing a glass or glass article of the invention, the method including the steps of:
melting the glass raw materials,
cooling the glass obtained.

Optionally, the method does not include oxygen bubbling. Optionally, the method does not include use of $NO_3$. Optionally, the method does neither include oxygen bubbling nor use of $NO_3$.

In particular if cations of chromium are present in the glass, very high melting temperatures are optionally avoided as this may be associated with generation of $Cr^{2+}$ that may compromise the high transmittance in the NIR range. Optionally, melting temperatures are in a range of from 1410° C. to 1450° C., optionally from 1415° C. to 1445° C., optionally from 1420° C. to 1440° C., optionally from 1425° C. to 1435° C., optionally about 1430° C. Melting the glass raw materials may for example include melting temperatures of at least 1410° C., at least 1415° C., at least 1420° C., or at least 1425° C. Melting the glass raw materials may for example include melting temperatures of at most 1450° C., at most 1445° C., at most 1440° C., or at most 1435° C.

The method may further include the step of refining the glass melt, in particular subsequent to melting the glass raw materials and prior to cooling the glass obtained. The refining step optionally includes the use of a refining agent, in particular use of Cl as a refining agent. Cl is an optional refining agent. One major advantage of Cl is that Cl may be used for controlling the water content and thereby controlling the NIR transmittance, in particular at the relevant wavelength ranges of the invention, for example the range from 1500 to 1600 nm, such as at a wavelength of 1550 nm. In one aspect, the method includes the step of controlling the water content of the glass melt, in particular by use of Cl.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawing, wherein.

Corresponding reference characters indicate corresponding parts throughout the several views. The exemplification set out herein illustrate embodiments of the invention, and such exemplifications are not to be construed as limiting the scope of the invention in any manner.

DETAILED DESCRIPTION OF THE INVENTION

Examples

Figure 1:
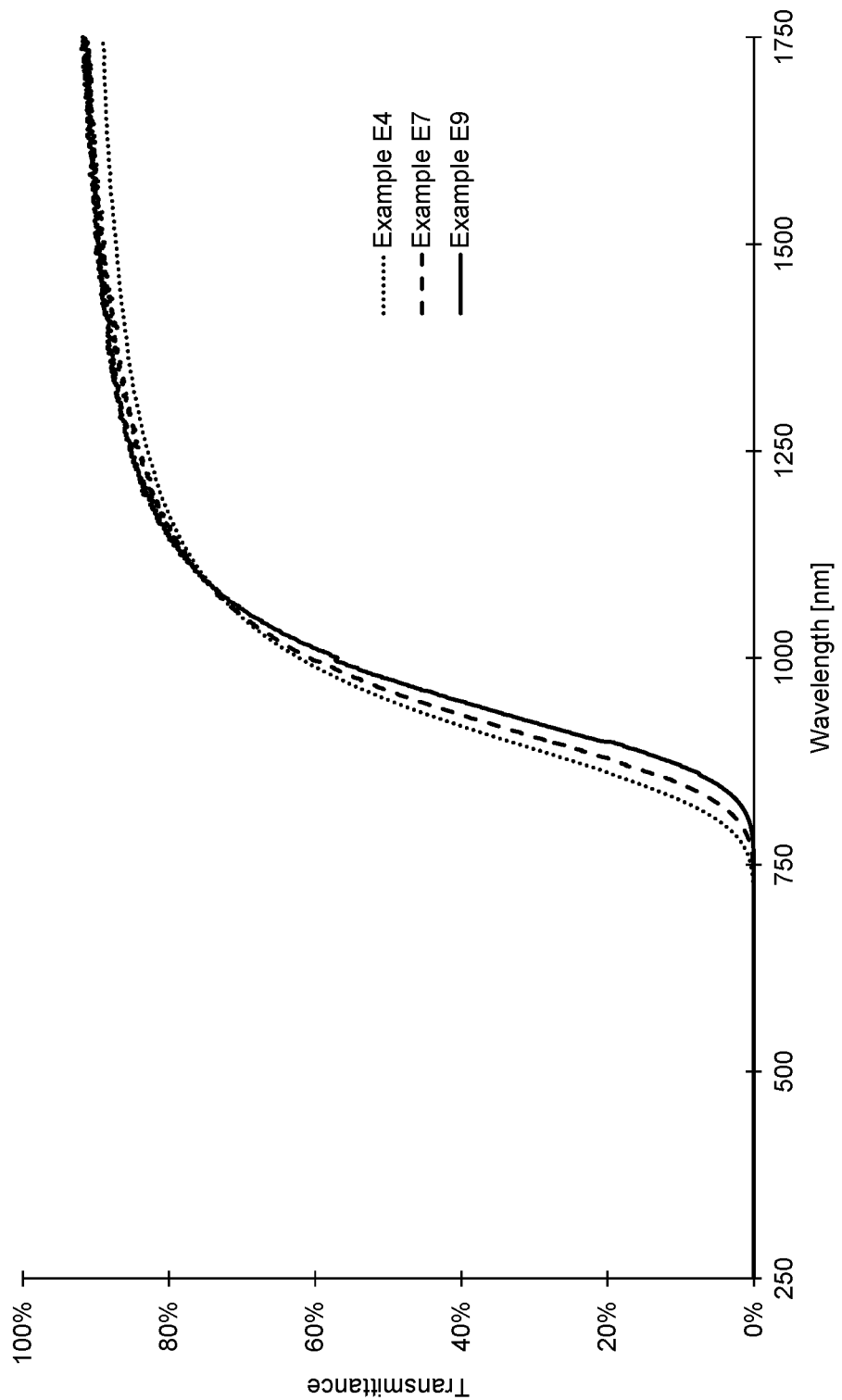
FIG. 1 shows the transmittance of example glasses E4, E7 and E9 in the wavelength range from 250 to 1750 nm for a sample thickness of 2 mm.

The present invention is further described by the following examples.

Glass Compositions

The following table shows the synthesis compositions of example glasses E1 to E9 of the present invention in wt.-%.

| | E1 | E2 | E3 | E4 | E5 | E6 | E7 | E8 | E9 |
|---|---|---|---|---|---|---|---|---|---|
| $SiO_2$ | 63.0 | 68.8 | 61.2 | 59.8 | 62.6 | 68.0 | 69.0 | 69.0 | 68.0 |
| $Al_2O_3$ | | | | | | | | | |
| $B_2O_3$ | 2.0 | 3.0 | 5.0 | 4.9 | 1.4 | 6.0 | 8.0 | 3.0 | 3.0 |
| $Li_2O$ | | | | | | | | | 1.0 |
| $Na_2O$ | 6.8 | 10.1 | 6.7 | 5.6 | 5.7 | 10.0 | 10.0 | 10.0 | 9.0 |
| $K_2O$ | 14.7 | 6.1 | 14.5 | 9.8 | 12.6 | 4.0 | 3.0 | 6.0 | 5.0 |
| BaO | 3.6 | 4.0 | 3.0 | | | 2.0 | 1.0 | 2.0 | 4.0 |
| CaO | | | | | | | | | |
| MgO | | | | | | | | | |
| ZnO | 2.8 | 2.8 | 2.8 | 2.5 | 2.9 | 3.0 | 2.0 | 3.5 | 3.0 |
| $La_2O_3$ | | | | 12.7 | 10.6 | | | | |
| $TiO_2$ | 2.0 | | 2.0 | | | | | | |
| Cl | | 0.5 | | | | 0.5 | 0.5 | 0.5 | 0.5 |
| $Sb_2O_3$ | 0.4 | | 0.1 | 0.4 | 0.1 | | | | |
| $MnO_2$ | 3.2 | 3.2 | 3.1 | 3.1 | 2.7 | 3.2 | 3.2 | 3.2 | 3.2 |

|       | E1   | E2   | E3   | E4   | E5   | E6   | E7   | E8   | E9   |
|-------|------|------|------|------|------|------|------|------|------|
| $Cr_2O_3$ | 1.4  | 1.4  | 1.3  | 1.3  | 1.1  | 1.4  | 1.4  | 1.4  | 1.4  |
| $\Sigma R_2O$ | 21.5 | 16.2 | 21.2 | 15.4 | 18.3 | 14.0 | 13.0 | 16.0 | 15.0 |
| Ratio $MnO_2/Cr_2O_3$ | 2.3 | 2.3 | 2.4 | 2.4 | 2.5 | 2.3 | 2.3 | 2.3 | 2.3 |

The following table shows the synthesis compositions of example glasses E10 to E18 of the present invention in wt.-%.

|       | E10  | E11  | E12  | E13  | E14  | E15  | E16  | E17  | E18  |
|-------|------|------|------|------|------|------|------|------|------|
| $SiO_2$ | 68.0 | 71.0 | 68.0 | 68.0 | 71.0 | 72.0 | 74.0 | 68.0 | 71.0 |
| $Al_2O_3$ |    | 6.0  | 2.0  |      | 6.0  | 4.0  | 3.0  |      | 6.0  |
| $B_2O_3$ | 3.0 | 10.0 | 3.0 | 3.0 | 10.0 | 5.0 | 11.0 | 3.0 | 10.0 |
| $Li_2O$ |     |      |      |      |      |      |      |      |      |
| $Na_2O$ | 9.0 | 8.0 | 11.0 | 12.0 | 8.0 | 8.0 | 8.0 | 12.0 | 8.0 |
| $K_2O$ | 6.0 | 1.0 | 4.0 | 5.0 | 1.0 | 4.0 |     | 5.0 | 1.0 |
| BaO   | 2.0 | 4.0 |     | 4.0 | 4.0 | 3.0 | 2.0 | 4.0 | 4.0 |
| CaO   |     | 1.0 | 8.0 |     |     | 1.0 | 5.0 | 3.0 | 1.0 |
| MgO   | 3.0 |     | 4.0 |     |     |     |     |     |     |
| ZnO   | 2.5 |     |     | 1.8 |     | 1.0 |     | 1.8 |     |
| $La_2O_3$ |  |     |     |     |     |     |     |     |     |
| $TiO_2$ |   |      |      |      |      |      |      |      |      |
| Cl    | 0.5 | 0.5 | 0.5 | 0.5 | 0.5 | 0.5 | 0.5 | 0.5 | 0.5 |
| $Sb_2O_3$ |  |    |     |     |     |     |     |     |     |
| $MnO_2$ | 3.2 | 3.7 | 3.7 | 3.1 | 3.4 | 2.9 | 2.9 | 2.7 | 2.9 |
| $Cr_2O_3$ | 1.4 | 1.5 | 1.5 | 1.3 | 1.4 | 1.1 | 1.1 | 1.0 | 1.1 |
| $\Sigma R_2O$ | 15.0 | 9.0 | 15.0 | 15.0 | 18.0 | 13.0 | 19.0 | 15.0 | 18.0 |
| Ratio $MnO_2/Cr_2O_3$ | 2.3 | 2.5 | 2.5 | 2.4 | 2.4 | 2.6 | 2.6 | 2.7 | 2.6 |

The following table shows the synthesis compositions of example glasses E19 to E22 of the present invention in wt.-%.

|       | E19  | E20  | E21  | E22  |
|-------|------|------|------|------|
| $SiO_2$ |     | 68.4 | 71.2 | 71.7 |
| $Al_2O_3$ | 5.8 |      |      | 5.8 |
| $B_2O_3$ | 9.6 | 3.1 | 3.2 | 9.7 |
| $Li_2O$ |     |      |      |      |
| $Na_2O$ | 7.7 | 12.6 | 12.7 | 7.8 |
| $K_2O$ | 1.0 | 5.2 | 5.3 | 1.0 |
| BaO   | 3.9 | 4.2 | 4.2 | 3.9 |
| CaO   | 1.0 |     |     | 1.0 |
| MgO   |     |      |      |      |
| ZnO   |     | 1.9 | 1.9 |     |
| $La_2O_3$ |  |     |     |     |
| $TiO_2$ |   |      |      |      |
| Cl    | 0.5 | 0.5 | 0.5 | 0.5 |
| $Sb_2O_3$ |  |    |     |     |
| MnO2  | 1.6 | 0.9 | 0.4 | 0.8 |
| $Cr_2O_3$ | 0.7 | 0.4 | 0.2 | 0.3 |
| $\Sigma R_2O$ | 8.7 | 17.8 | 17.9 | 8.8 |
| Ratio $MnO_2/Cr_2O_3$ | 2.3 | 2.3 | 2.0 | 2.7 |

Optical Properties

The transmittance properties of glasses of the present invention were tested. In the following, transmittance properties of examples E1, E4 and E6 to E10 having a thickness of 2 mm or 4 mm, respectively, are summarized.

The $P_d$ values of the respective glasses were as follows:

|         | E1    | E4    | E6    | E7    | E8    | E9    | E10   |
|---------|-------|-------|-------|-------|-------|-------|-------|
| $P_d$ value | 0.921 | 0.921 | 0.918 | 0.919 | 0.921 | 0.921 | 0.921 |

Figure 2:
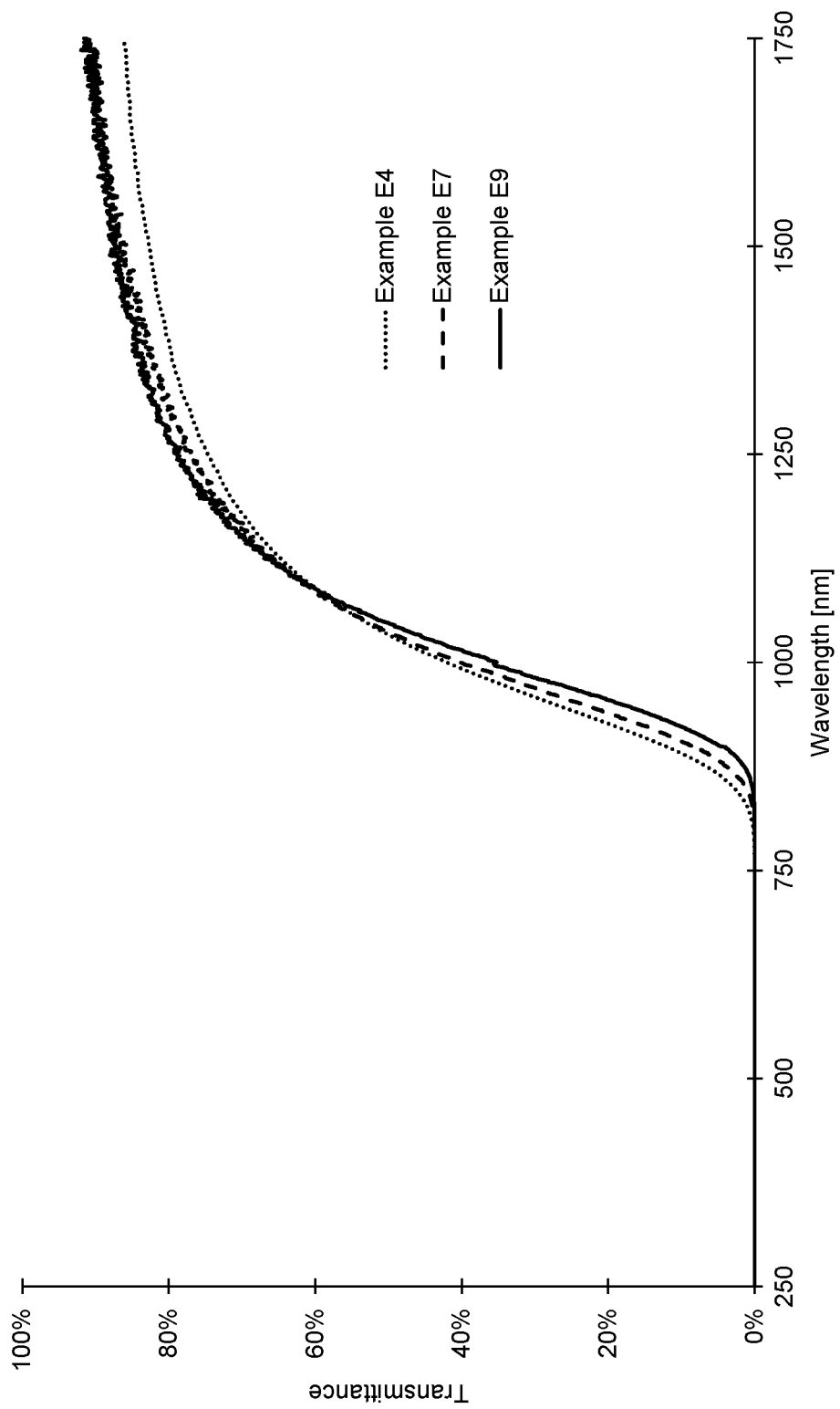
FIG. 2 shows the transmittance of example glasses E4, E7 and E9 in the wavelength range from 250 to 1750 nm for a sample thickness of 4 mm.

It was found that the glasses have a low transmittance in the visible range and a high transmittance in the NIR range. Exemplary transmittance curves are shown in FIGS. 1 and 2. A detailed analysis of transmittance properties is shown in the following.

Maximum and Minimum Transmittance

The following tables show transmittance properties of the glasses of the present invention. In particular, the maximum transmittance (Max. Transmittance) in the wavelength range from 250 to 700 nm and the minimum transmittance (Min. Transmittance) in the wavelength ranges from 800 to 900 nm, from 1250 to 1350 nm, and from 1500 to 1600 nm are shown. The transmittance was measured for any wavelength in the indicated intervals in intervals of 1 nm and the maximum or minimum transmittance, respectively, was determined.

The following table summarizes the results for a thickness of 2 mm.

|     | Max. Transmittance (250-700 nm) | Min. Transmittance (800-900 nm) | Min. Transmittance (1250-1350 nm) | Min. Transmittance (1500-1600 nm) |
|-----|------|------|-------|-------|
| E1  | 0.2% | 0.7% | 84.2% | 87.9% |
| E4  | 0.01% | 4.3% | 82.9% | 87.3% |
| E6  | 0.0003% | 1.0% | 83.9% | 88.8% |
| E7  | 0.002% | 1.9% | 84.1% | 88.8% |
| E8  | 0.04% | 1.0% | 84.9% | 88.2% |
| E9  | 0.001% | 0.6% | 85.0% | 89.5% |
| E10 | 0.02% | 3.4% | 85.8% | 88.5% |

For all example glasses, there is basically zero transmittance in the visible range. The transmittance in the wavelength range of from 800 to 900 nm is also very low. However, there is high transmittance in the relevant wavelength ranges of from 1250 to 1350 nm and from 1500 to 1600 nm.

The following table summarizes the results for a thickness of 4 mm.

|     | Max. Transmittance (250-700 nm) | Min. Transmittance (800-900 nm) | Min. Transmittance (1250-1350 nm) | Min. Transmittance (1500-1600 nm) |
|-----|------|------|-------|-------|
| E1  | $3*10^{-4}$% | 0.01% | 76.9% | 83.8% |
| E4  | $2*10^{-6}$% | 0.2% | 74.7% | 82.7% |
| E6  | $1*10^{-9}$% | 0.01% | 76.7% | 85.9% |
| E7  | $4*10^{-8}$% | 0.04% | 76.9% | 85.8% |
| E8  | $2*10^{-5}$% | 0.01% | 78.2% | 84.4% |
| E9  | $7*10^{-9}$% | 0.003% | 78.4% | 86.9% |
| E10 | $3*10^{-6}$% | 0.1% | 79.9% | 85.0% |

For all example glasses, there is basically zero transmittance in the visible range. The transmittance in the wavelength range of from 800 to 900 nm is also very low. However, there is high transmittance in the relevant wavelength ranges of from 1250 to 1350 nm and from 1500 to 1600 nm.

The following table summarizes the results for a thickness of 2 mm.

|  | Max. Transmittance (250-700 nm) | Min. Transmittance (800-900 nm) | Min. Transmittance (1250-1350 nm) | Min. Transmittance (1500-1600 nm) |
|---|---|---|---|---|
| E19 | 2.3% | 25.4% | 88.2% | 90.2% |
| E20 | 3.4% | 24.1% | 90.2% | 91.5% |
| E21 | 24.7% | 55.3% | 91.6% | 91.8% |
| E22 | 25.0% | 57.1% | 91.2% | 91.7% |

For all example glasses, there is high transmittance in the relevant wavelength ranges of from 1250 to 1350 nm and from 1500 to 1600 nm. Moreover, for example glasses E19 and E20, there is a low transmittance in the visible range The following table summarizes the results for a thickness of 4 mm.

|  | Max. Transmittance (250-700 nm) | Min. Transmittance (800-900 nm) | Min. Transmittance (1250-1350 nm) | Min. Transmittance (1500-1600 nm) |
|---|---|---|---|---|
| E19 | 0.1% | 7.0% | 84.4% | 88.4% |
| E20 | 0.1% | 6.3% | 88.4% | 90.8% |
| E21 | 6.6% | 33.2% | 91.0% | 91.6% |
| E22 | 6.8% | 35.4% | 90.3% | 91.2% |

For all example glasses, there is high transmittance in the relevant wavelength ranges of from 1250 to 1350 nm and from 1500 to 1600 nm. Moreover, for all example glasses, there is a low transmittance in the visible range.

Average Transmittance

The following tables show transmittance properties of the glasses of the present invention. In particular, the average transmittance (Avg. Transmittance) in the wavelength range from 250 to 700 nm, from 800 to 900 nm, from 1250 to 1350 nm, and from 1500 to 1600 nm is shown. The transmittance was measured for any wavelength in the indicated ranges in intervals of 1 nm and the average transmittance was calculated as the mean of all measured transmittance values within the respective range.

The following table summarizes the results for a thickness of 2 mm.

|  | Avg. Transmittance (250-700 nm) | Avg. Transmittance (800-900 nm) | Avg. Transmittance (1250-1350 nm) | Avg. Transmittance (1500-1600 nm) |
|---|---|---|---|---|
| E1 | 0.004% | 8.5% | 85.3% | 88.3% |
| E4 | 0.001% | 17.3% | 84.2% | 87.8% |
| E6 | 0.00001% | 9.6% | 85.3% | 89.4% |
| E7 | 0.0001% | 12.3% | 85.5% | 89.6% |
| E8 | 0.002% | 9.4% | 86.0% | 88.8% |
| E9 | 0.00003% | 7.3% | 86.5% | 90.1% |
| E10 | 0.001% | 16.0% | 86.7% | 88.8% |

For all example glasses, there is basically zero transmittance or less than 10% in the visible range. The transmittance in the wavelength range of from 800 to 900 nm is also very low. However, there is high transmittance in the relevant wavelength ranges of from 1250 to 1350 nm and from 1500 to 1600 nm.

The following table summarizes the results for a thickness of 4 mm.

|  | Avg. Transmittance (250-700 nm) | Avg. Transmittance (800-900 nm) | Avg. Transmittance (1250-1350 nm) | Avg. Transmittance (1500-1600 nm) |
|---|---|---|---|---|
| E1 | $6*10^{-6}$% | 1.3% | 79.0% | 84.7% |
| E4 | $4*10^{-8}$% | 4.1% | 77.0% | 83.7% |
| E6 | $1*10^{-11}$% | 1.6% | 79.3% | 87.0% |
| E7 | $2*10^{-9}$% | 2.3% | 79.6% | 87.5% |
| E8 | $5*10^{-7}$% | 1.5% | 80.3% | 85.6% |
| E9 | $2*10^{-10}$% | 1.0% | 81.3% | 88.2% |
| E10 | $1*10^{-7}$% | 3.6% | 81.7% | 85.6% |

For all example glasses, there is basically zero transmittance or less than 2% in the visible range. The transmittance in the wavelength range of from 800 to 900 nm is also very low. However, there is high transmittance in the relevant wavelength ranges of from 1250 to 1350 nm and from 1500 to 1600 nm.

The following table summarizes the results for a thickness of 2 mm.

|  | Avg. Transmittance (250-700 nm) | Avg. Transmittance (800-900 nm) | Avg. Transmittance (1250-1350 nm) | Avg. Transmittance (1500-1600 nm) |
|---|---|---|---|---|
| E19 | $2.5*10^{-3}$% | 20.8% | 85.7% | 88.8% |
| E20 | $3.5*10^{-3}$% | 22.2% | 89.2% | 91.1% |
| E21 | 7.6% | 68.8% | 91.4% | 91.8% |
| E22 | 8.5% | 68.9% | 91.0% | 91.6% |

For all example glasses, there is high transmittance in the relevant wavelength ranges of from 1250 to 1350 nm and from 1500 to 1600 nm.

The following table summarizes the results for a thickness of 4 mm.

|  | Avg. Transmittance (250-700 nm) | Avg. Transmittance (800-900 nm) | Avg. Transmittance (1250-1350 nm) | Avg. Transmittance (1500-1600 nm) |
|---|---|---|---|---|
| E19 | $3.3. 10^{-5}$% | 20.8% | 85.7% | 88.8% |
| E20 | $6.4 10^{-5}$% | 22.2% | 89.2% | 91.1% |
| E21 | 1.2% | 52.0% | 90.8% | 91.5% |
| E22 | 1.4% | 51.9% | 89.9% | 91.1% |

For all example glasses, there is a low transmittance or less than 2% in the visible range. However, there is high transmittance in the relevant wavelength ranges of from 1250 to 1350 nm and from 1500 to 1600 nm.

Solarization Properties

Figure 3:
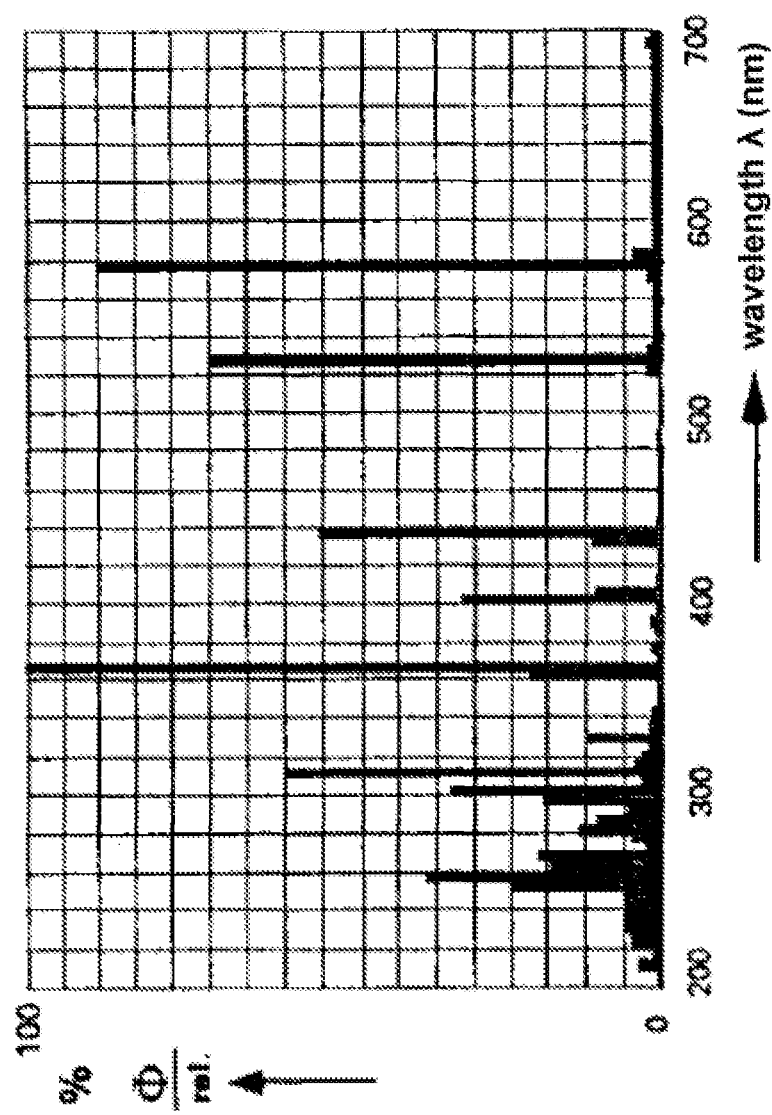
FIG. 3 shows the emission spectrum of the HOK 4/120 lamp from Phillips, on the x-axis the wavelength in nm being shown, on the y-axis the relative intensity being shown.
Figure 4:
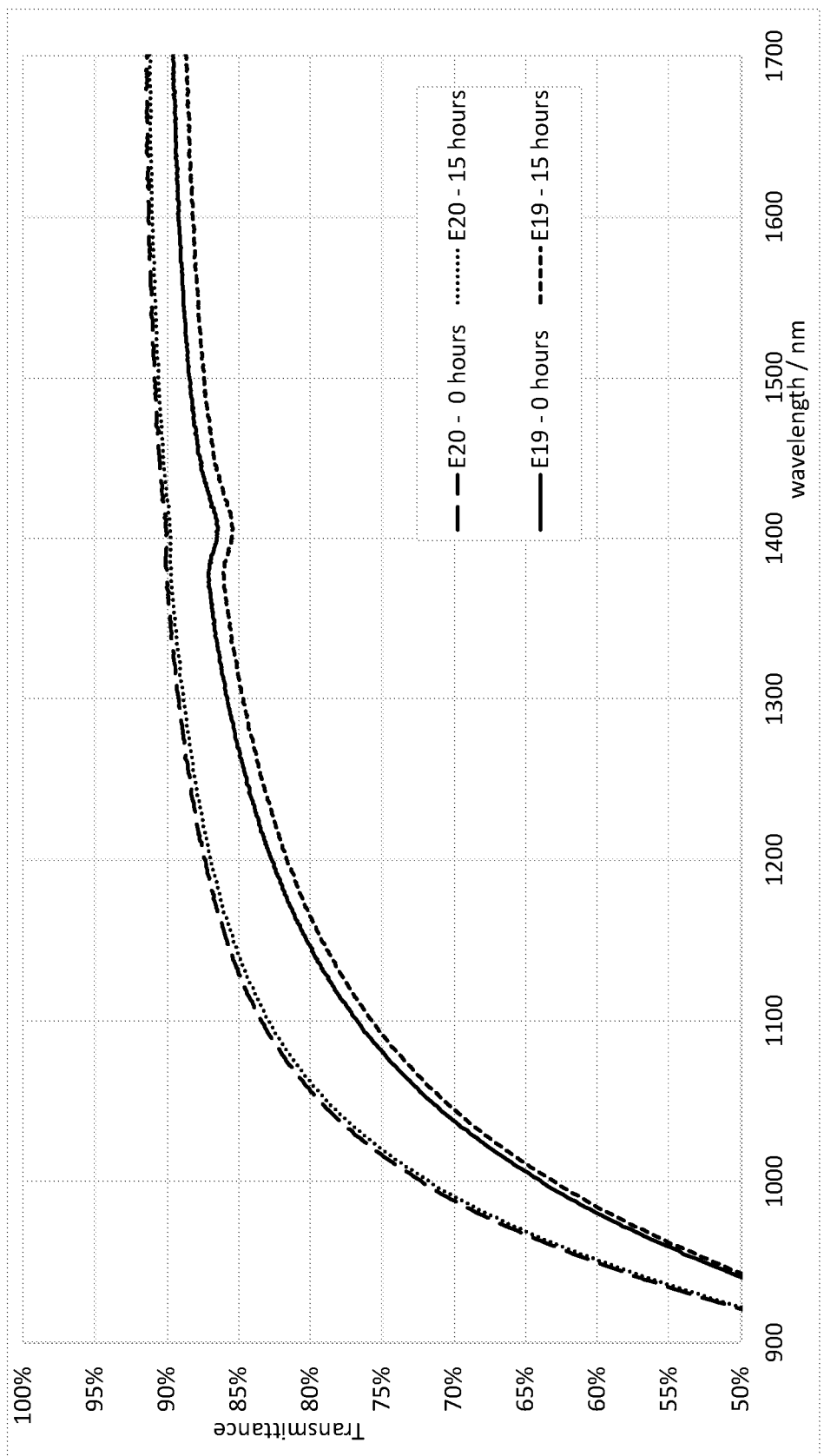
FIG. 4 shows the transmittance of example glasses E19 and E20 in the wavelength range from 900 nm to 1700 nm before and after an irradiation with a HOK 4/120 lamp from Phillips for 15 hours.

The transmittance of samples of example glasses E19 and E20 according to the present invention having a sample thickness of 4 mm was measured before ($T_{initial}$) and after irradiation with a HOK 4 lamp for 15 hours each ($T_{irridated}$). A HOK 4/120 lamp from Phillips was used. The spectrum of this HOK 4/120 lamp is shown in FIG. 3. The distance between the lamp and the sample was 7 cm. The power density was 25 mW/cm$^2$. The sample size was 18 mm×4 mm. The composition of the glasses is shown in the tables above.

The following table summarizes the results for a sample thickness of 4 mm at a wavelength of 1320 nm and 1550 nm.

| | T(1320 nm)$_{initial}$ | T(1320 nm)$_{irridatiad}$ | ΔT(1320 nm)$_{sol}$ | T(1550 nm)$_{initial}$ | T(1550 nm)$_{irridiated}$ | ΔT(1550 nm)$_{sol}$ |
|---|---|---|---|---|---|---|
| E19 | 86.2% | 85.1% | 1.1% | 88.8% | 87.8% | 1.0 |
| E20 | 89.4% | 89.1% | 0.3 | 91.1% | 90.8% | 0.3 |

For the example glasses E19 and E20 the evaluated values for ΔT(1320 nm)$_{sol}$ and ΔT(11550 nm)$_{sol}$ are very low.

Mechanical Properties

Two glass articles were subjected to the stone impact test according to method A of DIN EN ISO 20567-1:2017-07. The sample thickness was 3.8 mm for each of the samples. The net sample size was 80×80 mm² for each of the samples. Both glass articles passed the test. None of the glass articles was broken. Both glass articles achieved a characteristic value of 2.0 in the stone impact test according to method A of DIN EN ISO 20567-1:2017-07. The term "method A" refers to the test pressure being 1.0±0.1 bar. The characteristic value in the stone impact test was determined based on the damaged area of the sample according to DIN EN ISO 20567-1:2017-07. The test conditions and settings of the stone impact test are summarized in the following table.

| | |
|---|---|
| Funding time/Gravel feed per cycle: | 10 sec. ± 2 sec. |
| Grit/Blasting material: | Chilled iron grit as per DIN EN ISO 11124-2 |
| Mass of grit: | 2 × 500 g (0 + 20) |
| Number of cycles: | 2 |
| Grit/Blasting material size: | 3.55-5.00 mm according to DIN EN ISO 11125-2 and DIN EN ISO 565 |
| Manufacturer of gravel/grit | Eisenwerk Würth |
| Test pressure: | Method A: 1.0 ± 0.1 bar |
| | Method B: 2.0 ± 0.1 bar |
| Impact angle: | 54° |
| Temperature: | 22° C. ± 1° C. |
| Humidity: | 44% ± 2% |
| Adhesive tape: | Tesa 4657 |
| Pre-conditioning: | for min. 24 h at 23° C. and 50% RH |
| Distance between granule acceleration tube and sample center: | 290 ± 1 mm |

All loose particles generated by the stone impact test were removed with adhesive tape and the total loss of weight was determined as the total weight of all particles removed with the adhesive tape. The total loss of weight in the stone impact test according to method A of DIN EN ISO 20567-1:2017-07 was 61.7 mg for the first glass article and 64.0 mg for the second glass article.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass, comprising:
a plurality of components (in wt.-%) as follows:

| Component | Proportion (% by weight) |
|---|---|
| $SiO_2$ | 50-80 |
| $Al_2O_3$ | 0-10 |
| $B_2O_3$ | 0-15 |
| $Li_2O$ | 0-20 |
| $Na_2O$ | 0-20 |
| $K_2O$ | 0-25 |
| BaO | 0-10 |
| CaO | 0-10 |
| MgO | 0-10 |
| ZnO | 0-10 |
| $La_2O_3$ | 0-20 |
| $TiO_2$ | 0-5 |
| Cl | 0-3 |
| $MnO_2$ | 0.2-5.0 |
| $Cr_2O_3$ | 0.05-3.0, | a sum of a plurality of proportions of LiO, $Na_2O$ and $K_2O$ being in a range of from 5.0 to 30.0 wt.-%, a sum of a plurality of amounts of $MnO_2$ and $Cr_2O_3$ being at least 0.3 wt.-%, and a ratio of a plurality of proportions of $MnO_2$ (in wt.-%) and $Cr_2O_3$ (in wt.-%) being in a range of from 1.5:1 to 12.5:1, wherein the glass has at least one of:
  (a) a hydrolytic resistance according to class 1 of DIN ISO 719:2020-09;
  (b) a hydrolytic resistance according to class 1 of DIN ISO 720:1989-12;
  (c) an alkaline resistance according to class 2 of DIN ISO 695:1994-02; and
  (d) an acid resistance according to class 1 of DIN 12116: 2001-03.

2. The glass according to claim 1, wherein at least one of:
  (a) an amount of $Cr_2O_3$ is in a range of from 0.1 to 2.5 wt.-%; and
  (b) an amount of $MnO_2$ is in a range of from 0.3 to 4.5 wt.-%.

3. The glass according to claim 2, wherein at least one of:
  (a) the amount of $Cr_2O_3$ is in a range of from 0.15 to 2.0 wt.-%; and
  (b) the amount of $MnO_2$ is in a range of from 0.5 to 4.0 wt.-%.

4. The glass according to claim 1, wherein at least one of:
  (a) an amount of $Cr_2O_3$ is in a range of from 0.2 to 3.0 wt.-%;
  (b) an amount of $MnO_2$ is in a range of from 1.0 to 5.0 wt.-%; and
  (c) the sum of the plurality amounts of $MnO_2$ and $Cr_2O_3$ is at least 2.7 wt.-%.

5. The glass according to claim 4, wherein at least one of:
  (a) an amount of $Cr_2O_3$ is in a range of from 0.5 to 2.5 wt.-%;
  (b) an amount of $MnO_2$ is in a range of from 1.5 to 4.5 wt.-%; and
  (c) the sum of the plurality amounts of $MnO_2$ and $Cr_2O_3$ is at least 2.7 wt.-%.

6. The glass according to claim 1, wherein an amount of Cl is at least 0.1 wt.-%.

7. The glass according to claim 1, wherein the glass at a sample thickness of 2 mm has at least one of:
  (a) an average transmittance for light of a wavelength in a range of from 250 nm to 700 nm of at most 0.01%;
  (b) a maximum transmittance for light of a wavelength in a range of from 250 nm to 700 nm of at most 5.0%;

(c) an average internal transmittance for light of a wavelength in a range of from 250 nm to 700 nm of at most 0.1%; and
(d) a maximum internal transmittance for light of a wavelength in a range of from 250 nm to 700 nm of at most 5.0%.

8. The glass according to claim 1, wherein the glass at a sample thickness of 2mm has at least one of:
   (a) at least one of an average transmittance and a minimum transmittance for light of a wavelength in a range of from 1250 nm to 1350 nm of at least 50%; and
   (b) at least one of an average internal transmittance and a minimum internal transmittance for light of a wavelength in a range of from 1250 nm to 1350 nm of at least 50%.

9. The glass according to claim 1, wherein the glass at a sample thickness of 2 mm has at least one of:
   (a) at least one of an average transmittance and a minimum transmittance for light of a wavelength in a range of from 1500 nm to 1600 nm of at least 50%; and
   (b) at least one of an average internal transmittance and a minimum internal transmittance for light of a wavelength in a range of from 1500 nm to 1600 nm of at least 50%.

10. The glass according to claim 1, wherein the glass at a sample thickness of 4 mm has at least one of:
    (a) an average transmittance for light of a wavelength in a range of from 250 nm to 700 nm of at most 10%;
    (b) a maximum transmittance for light of a wavelength in a range of from 250 nm to 700 nm of at most 15.0%;
    (c) an average internal transmittance for light of a wavelength in a range of from 250 nm to 700 nm of at most 10%; and
    (d) a maximum internal transmittance for light of a wavelength in a range from 250 nm to 700 nm of at most 15%.

11. The glass according to claim 1, wherein the glass at a sample thickness of 2 mm has an internal transmittance at a wavelength of 1550 nm of at least 94.0%.

12. The glass according to claim 1, wherein the glass has at least one of:
    (a) a hydrolytic resistance according to class 1 of DIN ISO 719:2020-09;
    (b) a hydrolytic resistance according to class 1 of DIN ISO 720:1989-12;
    (c) an alkaline resistance according to class 1 of DIN ISO 695:1994-02; and
    (d) an acid resistance according to class 1 of DIN 12116: 2001-03.

13. A glass article, comprising:
    a glass including a plurality of components (in wt.-%) as follows:

| Component | Proportion (% by weight) |
|---|---|
| $SiO_2$ | 50-80 |
| $Al_2O_3$ | 0-10 |
| $B_2O_3$ | 0-15 |
| $Li_2O$ | 0-20 |
| $Na_2O$ | 0-20 |
| $K_2O$ | 0-25 |
| BaO | 0-10 |
| CaO | 0-10 |
| MgO | 0-10 |
| ZnO | 0-10 |
| $La_2O_3$ | 0-20 |
| $TiO_2$ | 0-5 |
| Cl | 0-3 |
| $MnO_2$ | 0.2-5.0 |
| $Cr_2O_3$ | 0.05-3.0, | a sum of a plurality of proportions of $Li_2O$, $Na_2O$ and $K_2O$ being in a range of from 5.0 to 30.0 wt.-%, a sum of a plurality of amounts of $MnO_2$ and $Cr_2O_3$ being at least 0.3 wt.-%, and a ratio of a plurality of proportions of $MnO_2$ (in wt.-%) and $Cr_2O_3$ (in wt.-%) being in a range of from 1.5:1 to 12.5:1, the glass article having a thickness in a range of from 1.0 mm to 7.0 mm, wherein at least one of:
   (a) a sum of all cross-sections of all bubbles and inclusions ≥0.03 mm in diameter is at most 0.5 mm² per 100 cm³ of a glass volume;
   (b) the glass article has a characteristic value of at most 1.30 per mm thickness of the glass article in a stone impact test according to method A of DIN EN ISO 20567-1:2017-07; and
   (c) the glass article has a total loss of weight of at most 150 mg per mm thickness of the glass article in a stone impact test according to method A of DIN EN ISO 20567-1:2017-07.

14. The glass article according to claim 13, wherein the glass article fulfills at least one of the following conditions:
   i) $\Delta T_{sol}(905\text{ nm}) = T(905\text{ nm})|_{initial} - T(905\text{ nm})|_{irradiated}$, wherein $\Delta T_{Sol}$ is less than 5%;
   ii) $\Delta T_{Sol}(1320\text{ nm}) = T(1320\text{ nm})|_{initial} - T(1320\text{ nm})|_{irradiated}$ wherein $\Delta T_{Sol}$ is less than 5%; and
   iii) $\Delta T_{Sol}(1550\text{ nm}) = T(1550\text{ nm})|_{initial} - T(1550\text{ nm})|_{irradiated}$ wherein $\Delta T_{sol}$ is less than 5%;
   wherein $T(\lambda)_{initial}$ is a transmission at a wavelength λ of a sample having a sample thickness of 4 mm prior to an irradiation, $T(\lambda)_{irradiated}$ is a transmission at a wavelength λ of a sample having a sample thickness of 4 mm after an irradiation of 15 hours with a HOK 4 lamp, and $\Delta T_{sol}$ is a difference between $T(\lambda)$ initial and $T(\lambda)_{irradiated}$.

15. The glass article according to claim 13, wherein at least one of:
   (a) a sum of all cross-sections of all bubbles and inclusions ≥0.03 mm in diameter is at most 0.25 mm² per 100 cm³ of a glass volume;
   (b) the glass article has a characteristic value of at most 1.30 per mm thickness of the glass article in a stone impact test according to method A of DIN EN ISO 20567-1:2017-07; and
   (c) the glass article has a total loss of weight of at most 150 mg per mm thickness of the glass article in a stone impact test according to method A of DIN EN ISO 20567-1:2017-07.

16. The glass article according to claim 13, wherein the glass article is formed at least in part by an optical window, which forms in part a LiDAR system including a laser and the optical window positioned between the laser and a surrounding.

* * * * *